United States Patent
Ando

(10) Patent No.: US 10,136,021 B2
(45) Date of Patent: Nov. 20, 2018

(54) INFORMATION PROCESSING APPARATUS, INFORMATION PROCESSING SYSTEM, METHOD FOR PROCESSING INFORMATION, AND PROGRAM

(71) Applicant: Mitsuo Ando, Fukuoka (JP)

(72) Inventor: Mitsuo Ando, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/454,178

(22) Filed: Mar. 9, 2017

(65) Prior Publication Data
US 2017/0272601 A1 Sep. 21, 2017

(30) Foreign Application Priority Data

Mar. 18, 2016 (JP) ................. 2016-055805

(51) Int. Cl.
*G06F 3/12* (2006.01)
*H04N 1/23* (2006.01)
*H04N 1/00* (2006.01)
*H04N 1/327* (2006.01)
*G06F 17/30* (2006.01)

(52) U.S. Cl.
CPC ......... *H04N 1/2338* (2013.01); *G06F 3/1204* (2013.01); *G06F 3/1238* (2013.01); *G06F 3/1267* (2013.01); *G06F 3/1292* (2013.01); *G06F 17/30964* (2013.01); *H04N 1/00236* (2013.01); *H04N 1/00307* (2013.01); *H04N 1/00344* (2013.01); *H04N 1/32776* (2013.01); *H04N 2201/0039* (2013.01); *H04N 2201/0055* (2013.01); *H04N 2201/0094* (2013.01); *H04N 2201/3205* (2013.01)

(58) Field of Classification Search
None
See application file for complete search history.

(56) References Cited

U.S. PATENT DOCUMENTS 9,019,516 B2 4/2015 Akiyoshi et al.
9,124,733 B2 9/2015 Ando
(Continued)

FOREIGN PATENT DOCUMENTS

JP 2010-250539 11/2010

OTHER PUBLICATIONS

Anonymous: "Printing guide Nokia E90 Communicator", Dec. 31, 2007 (Dec. 31, 2007), pp. 1-9, XP055372182, Retrieved from the Internet: URL:http://nds1.webapps.microsoft.com/phones/files/guides/Nokia_E90-1_Communicator_Printing_guide_en.pdf [retrieved on May 12, 2017].

(Continued)

*Primary Examiner* — Moustapha Diaby
(74) *Attorney, Agent, or Firm* — IPUSA, PLLC

(57) ABSTRACT

An information processing system includes an apparatus, and an information processing apparatus including a search unit configured to search for the apparatus through a wireless communication, a request unit configured to request the apparatus for an execution of an input or an output of data in response to an event where the search unit finds the apparatus, and an execution unit configured to cause the information processing apparatus to execute the input or the output of the data in response to an event where the search unit does not find the apparatus.

18 Claims, 27 Drawing Sheets

(56) References Cited

U.S. PATENT DOCUMENTS

| | | |
|---|---|---|
| 9,235,453 B2 | 1/2016 | Ando |
| 9,374,490 B2 | 6/2016 | Ando |
| 9,521,274 B2 | 12/2016 | Ando |
| 9,544,473 B2 | 1/2017 | Namihira et al. |
| 2004/0137855 A1 | 7/2004 | Wiley et al. |
| 2007/0264991 A1 | 11/2007 | Jones et al. |
| 2013/0083359 A1* | 4/2013 | Ishigure ............ H04N 1/00347 358/1.15 |
| 2013/0290101 A1* | 10/2013 | Arini ................. G06Q 30/0207 705/14.55 |
| 2014/0079428 A1* | 3/2014 | Park ................... H04N 1/00896 399/82 |
| 2014/0146363 A1 | 5/2014 | Hirokawa et al. |
| 2015/0281332 A1 | 10/2015 | Naito et al. |
| 2015/0326751 A1 | 11/2015 | Ando |
| 2016/0080585 A1* | 3/2016 | Kobayashi ......... H04N 1/00204 358/1.15 |
| 2016/0219575 A1* | 7/2016 | Park ..................... H04W 4/008 |
| 2016/0342577 A1 | 11/2016 | Ando |
| 2016/0344881 A1 | 11/2016 | Ando |

OTHER PUBLICATIONS

Extended European Search Report for 17160470.5 dated Jun. 9, 2017.
U.S. Appl. No. 15/283,504, filed Oct. 3, 2016.

* cited by examiner

FIG.12

| USER ID | PASSWORD | NAME | TERMINAL ID | INPUT OUTPUT MODE | PREFERENTIAL OPERATION | FLOW ID | APP ID |
|---|---|---|---|---|---|---|---|
| uid01 | pwd01 | COMPANY MEMBER A | mobile001 | ELECTRONIC | TERMINAL | S01 | url.s01 |
| uid02 | pwd02 | COMPANY MEMBER B | mobile002 | PAPER | OPERATION PANEL | S01 | url.s01 |
| uid03 | pwd03 | COMPANY MEMBER C | mobile003 | PAPER | REMOTE | S01 | url.s01 |
| uid04 | pwd04 | ADMINISTRATOR | — | — | — | S01 | url.s01 |

FIG.13

| VISITOR NAME | VISIT DESTINATION NAME | VISIT DESTINATION ADDRESS | DESIGNATED VISIT DATE |
|---|---|---|---|
| COMPANY MEMBER A | YAMADA | TOKYO PREF. ... | 2016/1/3 |
| COMPANY MEMBER B | SATOH | KANAGAWA PREF. ... | 2016/1/3 |
| COMPANY MEMBER C | INOUE | CHIBA PREF. ... | 2016/1/3 |

FIG.14

VISIT CARD

NAME OF VISIT DESTINATION:
MR. YAMADA
ADDRESS OF VISIT DESTINATION:
TOKYO PREF. ....

VISITOR NAME: COMPANY MEMBER A
VISIT DATE: XX/XX/XX

SIGNATURE

CIRCUMSTANCES CHECK RESULT

DESCRIPTION OF MEMO

FIG.15

| USER ID | DOCUMENT ID | STATUS | OUTPUT DESTINATION | DATE | FLOW ID |
|---|---|---|---|---|---|
| uid01 | ID01.pdf | PRE-BROWSE | — | 2016/01/03 8:00 | S01 |
| uid01 | ID01.pdf | BROWSING | mobile001 | 2016/01/03 9:00 | S01 |
| uid01 | ID01.pdf | BROWSED | mobile001 | 2016/01/03 10:00 | S01 |
| uid01 | ID01.pdf | UPDATED | mobile001 | 2016/01/03 11:00 | S01 |

FIG.16

| USER ID | NAME | VISIT DESTINATION NAME | VISIT DESTINATION ADDRESS | DESIGNATED VISIT DATE | JOB ID | DOCUMENT ID |
|---|---|---|---|---|---|---|
| uid01 | COMPANY MEMBER A | YAMADA | TOKYO PREF. ... | 2016/1/3 | ID01 | ID01.pdf |
| uid02 | COMPANY MEMBER B | SATOH | KANAGAWA PREF. ... | 2016/1/3 | ID02 | ID02.pdf |
| uid03 | COMPANY MEMBER C | INOUE | CHIBA PREF. ... | 2016/1/3 | ID03 | ID03.pdf |

FIG.19

| USER ID | PASSWORD | NAME | INPUT OUTPUT MODE | PREFERENTIAL OPERATION | FLOW ID | APP ID | JOB ID |
|---|---|---|---|---|---|---|---|
| uid01 | pwd01 | COMPANY MEMBER A | ELECTRONIC | TERMINAL | S01 | url.s01 | ID01 |

| APPARATUS NAME | APPARATUS BODY NUMBER | STATE | PREFERENTIAL USE | OPERATING METHOD | PRINT INFORMATION |
|---|---|---|---|---|---|
| MFP1 | 01234 | PRINT POSSIBLE | ○ | REMOTE | A3, A4, COLOR, DUPLEX |
| MFP2 | 01235 | PRINT IMPOSSIBLE | | REMOTE/ OPERATION PANEL | A4, BLACK AND WHITE, SIMPLEX |
| MFP3 | 01236 | NO CONNECTION | | OPERATION PANEL | A4, BLACK AND WHITE, SIMPLEX |

| APPARATUS NAME | OPERATING METHOD | PRINT INFORMATION |
|---|---|---|
| MFP1 | REMOTE | A3, A4, COLOR, DUPLEX |
| MFP2 | REMOTE/ OPERATION PANEL | A4, BLACK AND WHITE, SIMPLEX |
| MFP3 | OPERATION PANEL | A4, BLACK AND WHITE, SIMPLEX |

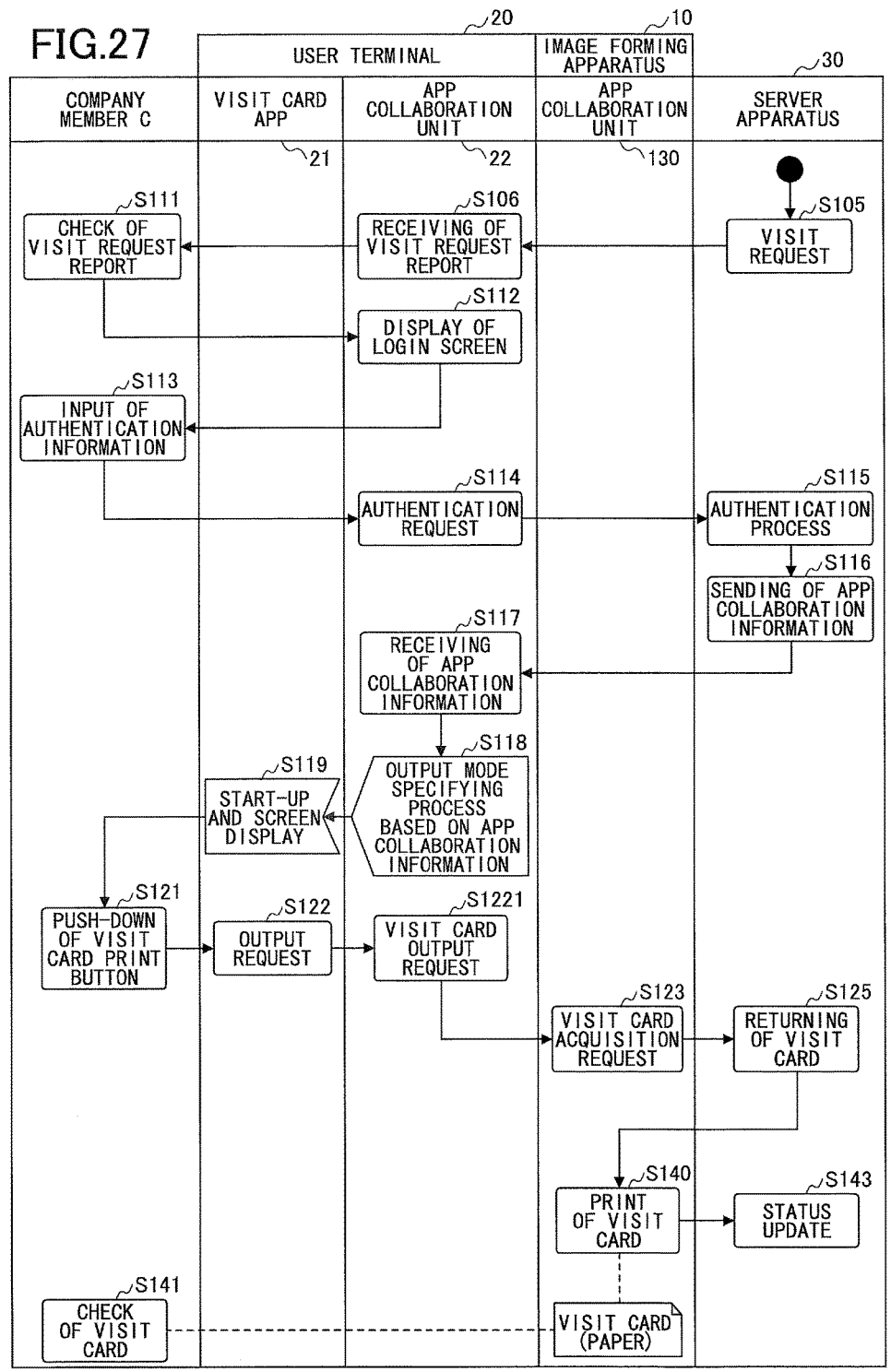

INFORMATION PROCESSING APPARATUS, INFORMATION PROCESSING SYSTEM, METHOD FOR PROCESSING INFORMATION, AND PROGRAM

CROSS-REFERENCE TO RELATED APPLICATIONS

The present application claims priority under 35 U.S.C. § 119 to Japanese Patent Application No. 2016-055805, filed Mar. 18, 2016. The contents of which are incorporated herein by reference in their entirety.

BACKGROUND OF THE INVENTION

Field of the Invention

The present invention relates to information devices, and in particular, relates to an information device that utilizes a touch screen.

The present invention relates to an information processing apparatus, an information processing system, and a method for processing information Description of the Related Art Computer systems are ordinarily used for business. Documents for the business are handled in a mode of either a paper document or an electronic document.

Under these circumstances, there are many cases where the mode of a document that can be input or output in a situation of, for example, a workflow or the like is either the paper document or the electronic document.

However, whether the paper document or the electronic document is easier to handle may differ for each user. Further, whether the paper document or the electronic document is required to be handled may differ depending on circumstances where an image forming apparatus is installed in the vicinity of a user.

SUMMARY OF THE INVENTION

An information processing system includes an apparatus, and an information processing apparatus including a search unit configured to search for the apparatus through a wireless communication, a request unit configured to request the apparatus for an execution of an input or an output of data in response to an event where the search unit finds the apparatus, and an execution unit configured to cause the information processing apparatus to execute the input or the output of the data in response to an event where the search unit does not find the apparatus.

BRIEF DESCRIPTION OF THE DRAWINGS

FIG. 12 illustrates an exemplary structure of a user information memory unit.

FIG. 13 illustrates a structural example of a visit request card.

FIG. 14 illustrates an exemplary visit card.

FIG. 15 illustrates an exemplary structure of a document information memory unit.

FIG. 16 illustrates an exemplary structure of a visit card flow information memory unit.

FIG. 19 illustrates an exemplary structure of an application (app) collaboration information memory unit.

FIG. 21 illustrates an exemplary structure of a peripheral apparatus information memory unit.

FIG. 22 illustrates an exemplary structure of an apparatus information memory unit.

FIG. 27 illustrates an exemplary procedure of the visit card output process of a fourth embodiment.

DESCRIPTION OF THE EMBODIMENTS

The present invention is provided with the above points. An object of the present invention is to relax a limit related to the input or the output of the document.

Figure 1:
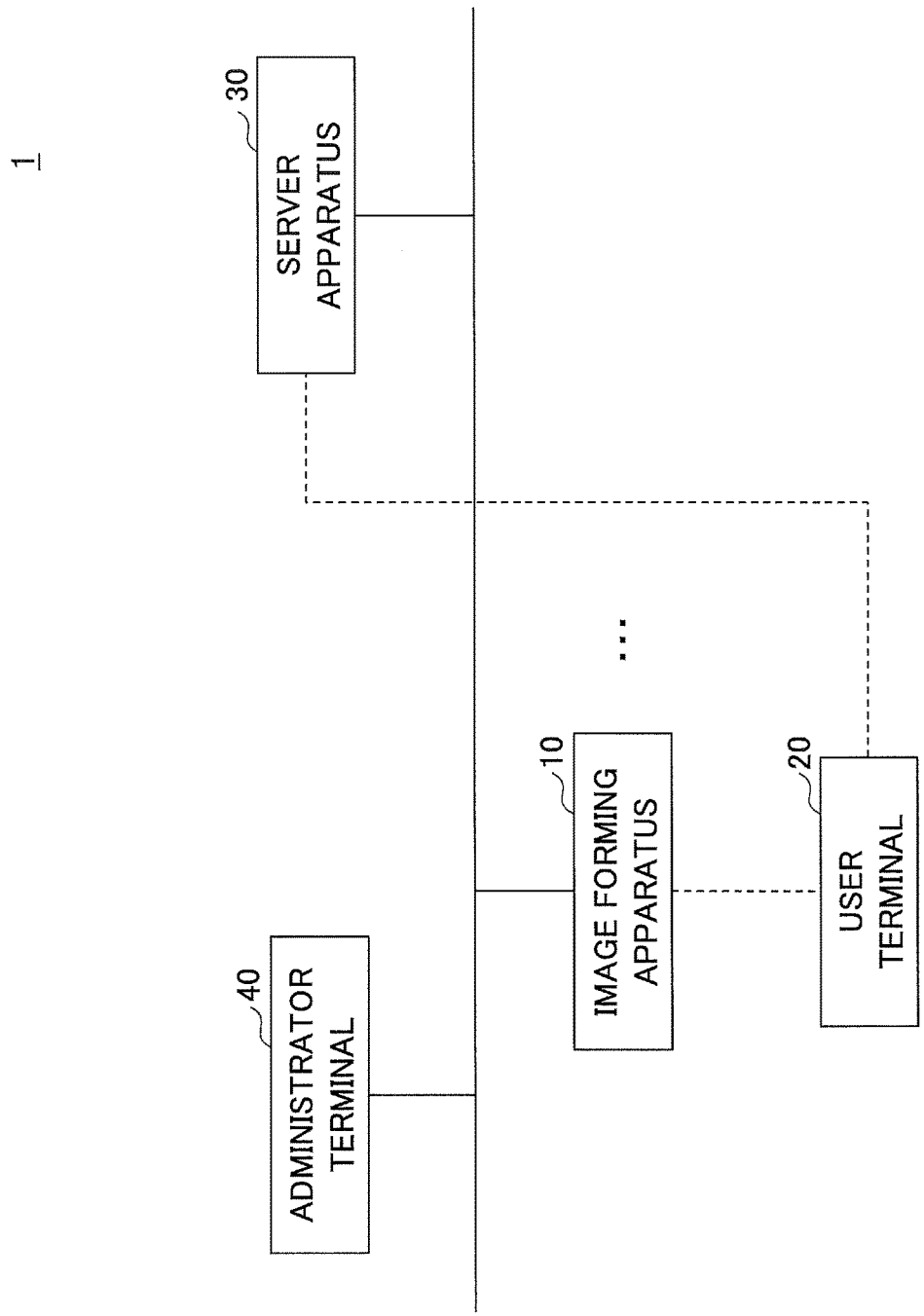
FIG. 1 illustrates an exemplary structure of an information processing system of an embodiment of the present invention.

Hereinafter, an embodiment of the present invention is described based on figures. FIG. 1 illustrates an exemplary structure of an information processing system of an embodiment of the present invention. Referring to FIG. 1, the information processing system 1 includes a server apparatus 30, an image forming apparatus 10, a user terminal 20, an administrator terminal, and so on. The image forming apparatus 10 and the administrator terminal 40 are communicable with the server apparatus 30 through a network such as a local area network (LAN) or the Internet. The user terminal 20 is communicable with the image forming apparatus 10 and the server apparatus 30 using a wireless communication.

The server apparatus 30 administers various information pieces used in a workflow implemented by the information processing system 1.

The image forming apparatus 10 is, for example, a multifunction peripheral (MFP). The image forming apparatus 10 is used as either an input source or an output destination of a document that is an operation target in the workflow.

The user terminal 20 is a smart terminal such as a smartphone and a tablet terminal. However, another terminal that has a display device and can perform the wireless communication may be used as the user terminal 20. The user terminal 20 is used as either the input source or the output destination of the document that is the operation target in the workflow. Hereinafter, "user" is the user of the user terminal unless otherwise noted.

The administrator terminal 40 is a terminal such as a personal computer (PC) used by an administrator or the like of a business operation, to which the workflow is applied.

Figure 2:
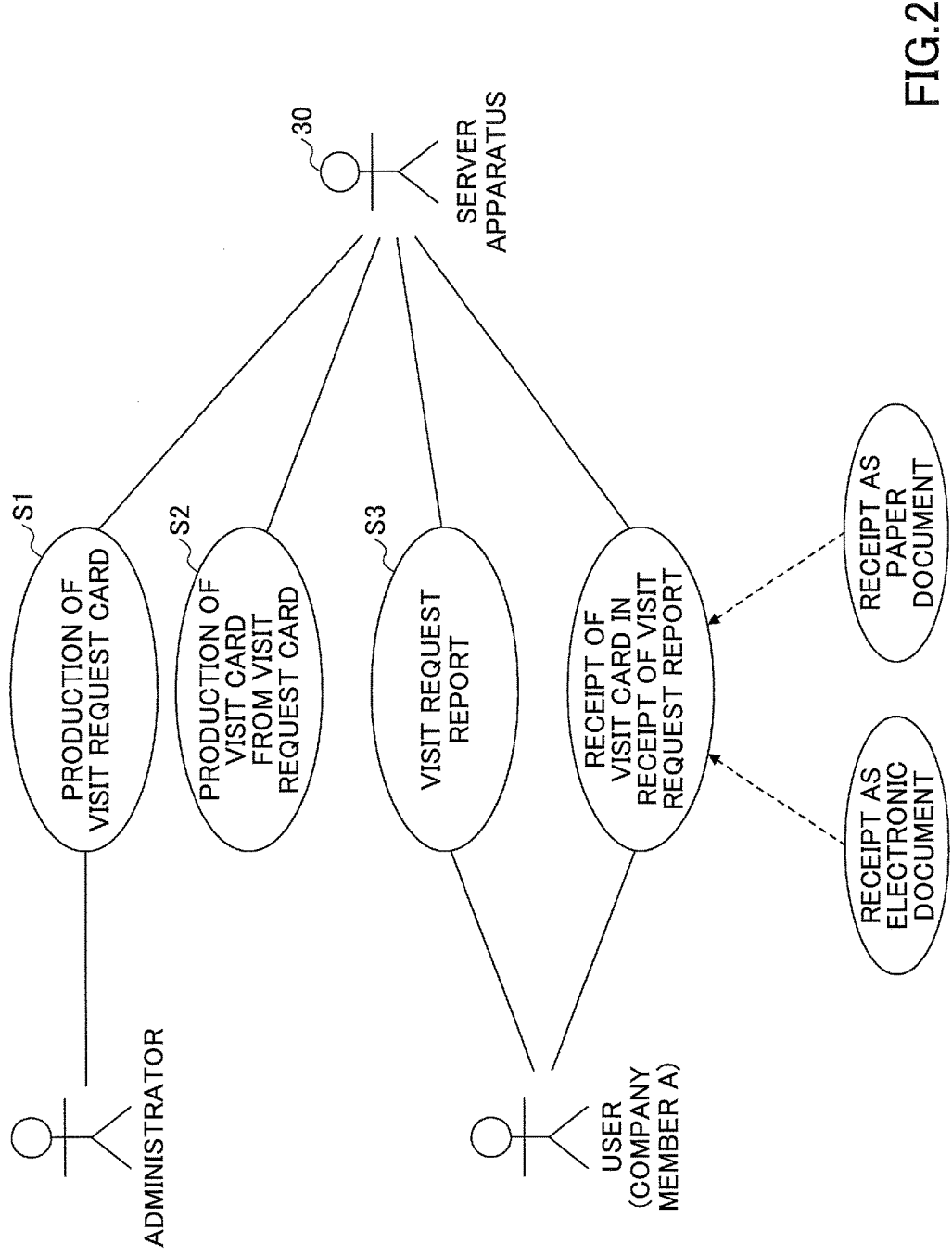
FIG. 2 illustrates a visit card flow.

Within the embodiment, a workflow (hereinafter, referred to as a "visit card flow") related to the visit card as illustrated in FIG. 2 is explained as an exemplary workflow.

FIG. 2 illustrates the visit card flow. For example, in a nursing-care visit, the administrator previously determines a visit destination for a nursing-care visitor and creates a visit request card that is a document for requesting this visit (step S1). The created visit request card is stored in the server apparatus 30. The server apparatus 30 creates a visit card in response to the creation of the visit request card (step S2) and reports generation of a visit request to the user terminal 20 of the visitor (e.g., a company member A in FIG. 2) (step S3). The visit card is a document into which the visitor visiting the designated visit destination writes information obtained in the visit destination. For example, in a nursing-care visit, a document, into which a result of a circumstances check obtained by the nursing-care visitor at the visit destination is written, is the visit card. The visitor uses the user terminal 20 or the image forming apparatus 10 and receives the visit card in response to the visit request report (step S4). Within the embodiment, the visit card of the state of the electronic document may be received using the user terminal 20, or the visit card of the state of the paper document may be received using the image forming apparatus 10.

Further, the visit card flow may be applied to a visit other than the nursing-care visit, e.g., a sales visit. Furthermore, the embodiment may be applicable to a workflow related to another document.

Figure 3:
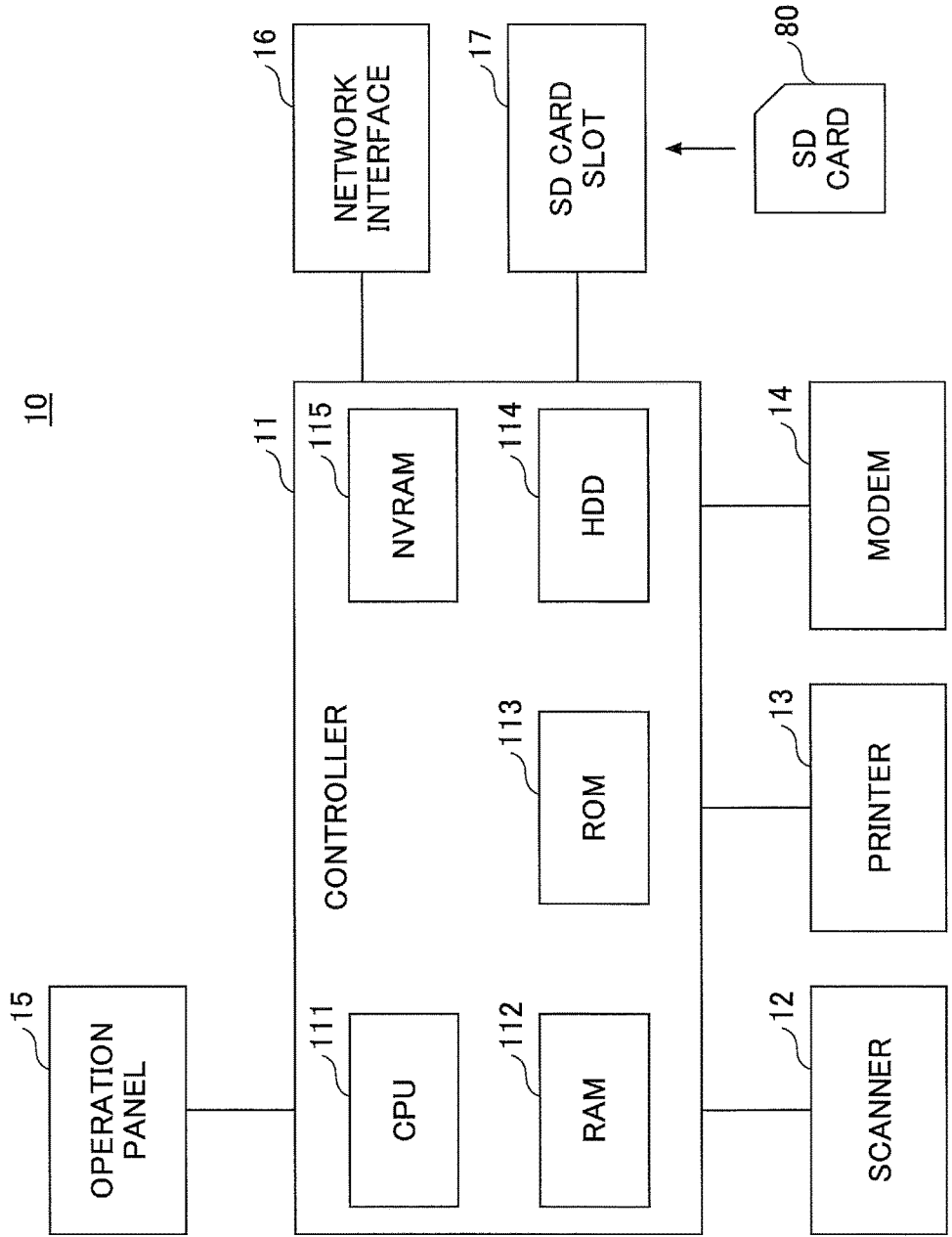
FIG. 3 illustrates an exemplary hardware structure of the image forming apparatus of the embodiment of the present invention.

FIG. 3 illustrates an exemplary hardware structure of the image forming apparatus of the embodiment. Referring to FIG. 3, the image forming apparatus 10 includes hardware such as a controller 11, a scanner 12, a printer 13, a modem 14, an operation panel 15, a network interface 16, and an SD card slot 17.

The controller 11 includes a central processing unit (CPU) 111, a random access memory (RAM) 112, a read-only memory (ROM) 113, a hard disk drive (HDD) 114, a non-volatile random access memory (NVRAM) 115, and so on. Various programs and data used by the programs are stored in the ROM 113. The RAM 112 is used as a memory area for loading the programs, a work area for the loaded programs, or the like. The CPU 111 implements various functions by processing the program loaded into the RAM 112. The HDD 114 stores the programs, various data used by the programs, or the like. The NVRAM 115 stores various setup information or the like.

The scanner 12 is hardware (an image reading unit) for reading image data from an original (an original manuscript). The printer 13 is hardware (a printing unit) for printing print data on a print paper. The modem 14 is hardware for connecting the apparatus 10 to a telecommunication line and is used for sending and receiving the image data with fax communications. The operation panel 15 is hardware provided with an input unit for receiving an input from the user such as a button, a display unit such as a liquid crystal panel, or the like. The liquid crystal panel may have a touch panel function. In this case, the liquid crystal panel may also have the function of the input unit. The network interface 16 is hardware for connecting the apparatus 10 to a wired or wireless network such as LAN. The SD card slot 17 is used to read a program recorded in the SD card 80. Said differently, not only the program stored in the ROM 113 but also the program stored in the SD card 80 may be loaded into the RAM 112 and executed by the image forming apparatus 10. The SD card 80 may be substituted by another recording medium such as a CD-ROM and a universal serial bus (USB) memory. The kind of the recording medium corresponding to the position of the SD card 80 may not be limited to a predetermined kind. In this case, the SD card slot 17 may be replaced by hardware depending on kinds of the recording medium.

Figure 4:
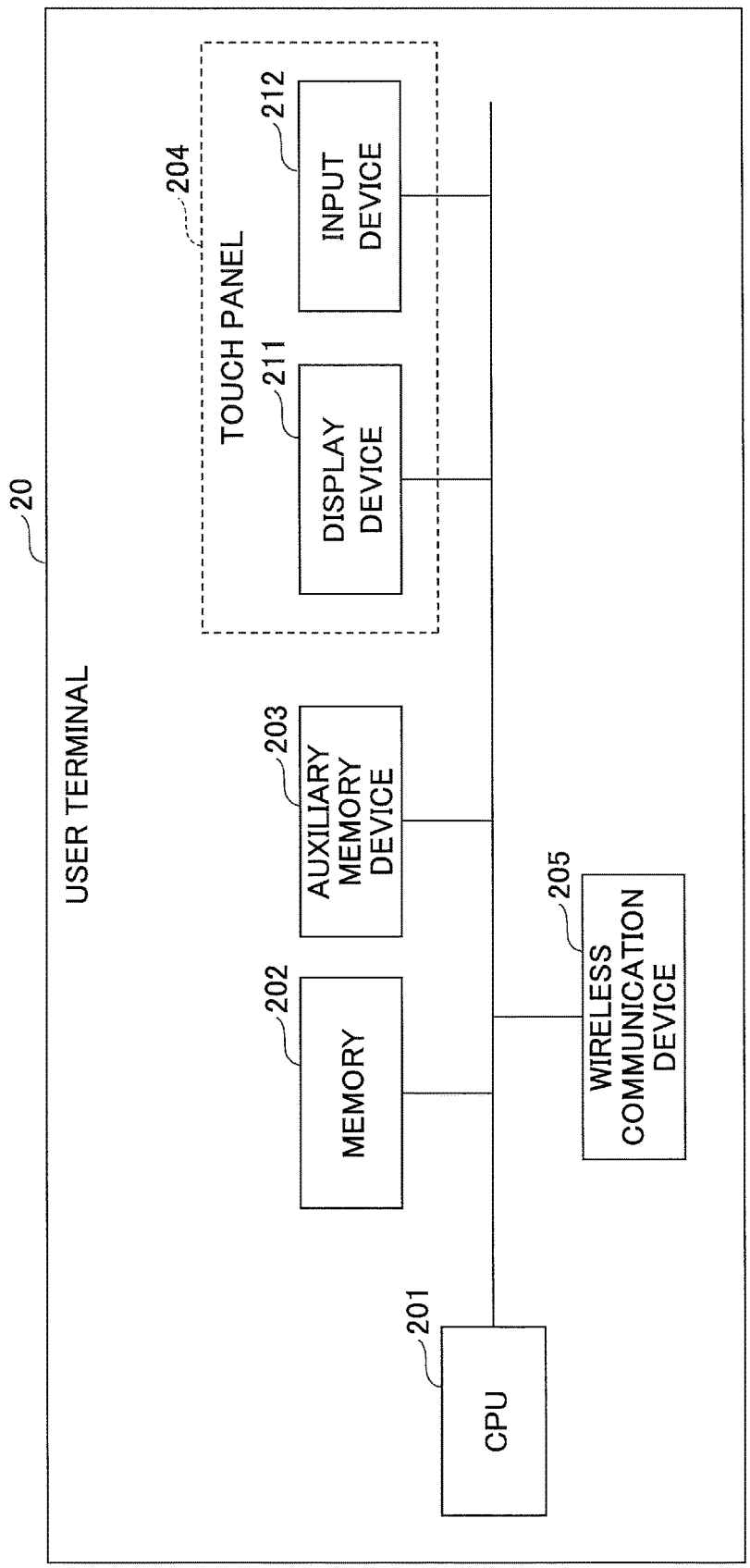
FIG. 4 illustrates an exemplary hardware structure of a user terminal of the embodiment of the present invention.

FIG. 4 illustrates an exemplary hardware structure of a user terminal of the embodiment. Referring to FIG. 4, the user terminal 20 includes a CPU 201, a memory 202, an auxiliary memory device 203, a touch panel 204, and a wireless communication apparatus 205.

The auxiliary memory device 203 stores a program or the like installed in the user terminal 20. The memory 202 reads out the program from the auxiliary memory device 203 when the program is instructed to be invoked and stores the program in the memory 202. The CPU 201 implements a function related to the user terminal 20 in conformity with the program stored in the memory 202.

The touch panel 204 is an electronic component having both an input function and a display function to display information or receive an input from the user. The touch panel 204 includes a display device 211, an input device 212, or the like.

The display device 211 is a liquid crystal display or the like and performs a display function of the touch panel 204. The input device 212 is an electronic component including a sensor for detecting a touch of a touching object on the display device 211. A detection method of the touching object may be any one of known methods such as an electrostatic method, a resistance film method, and an optical method. The touching object is an object touching a contact surface (a front surface) of the touch panel 204. As an example of the touching object is a finger of the user, a dedicated pen, an ordinary pen, or the like.

The wireless communication device 205 is an electronic part such as an antenna for enabling the wireless communications.

Figure 5:
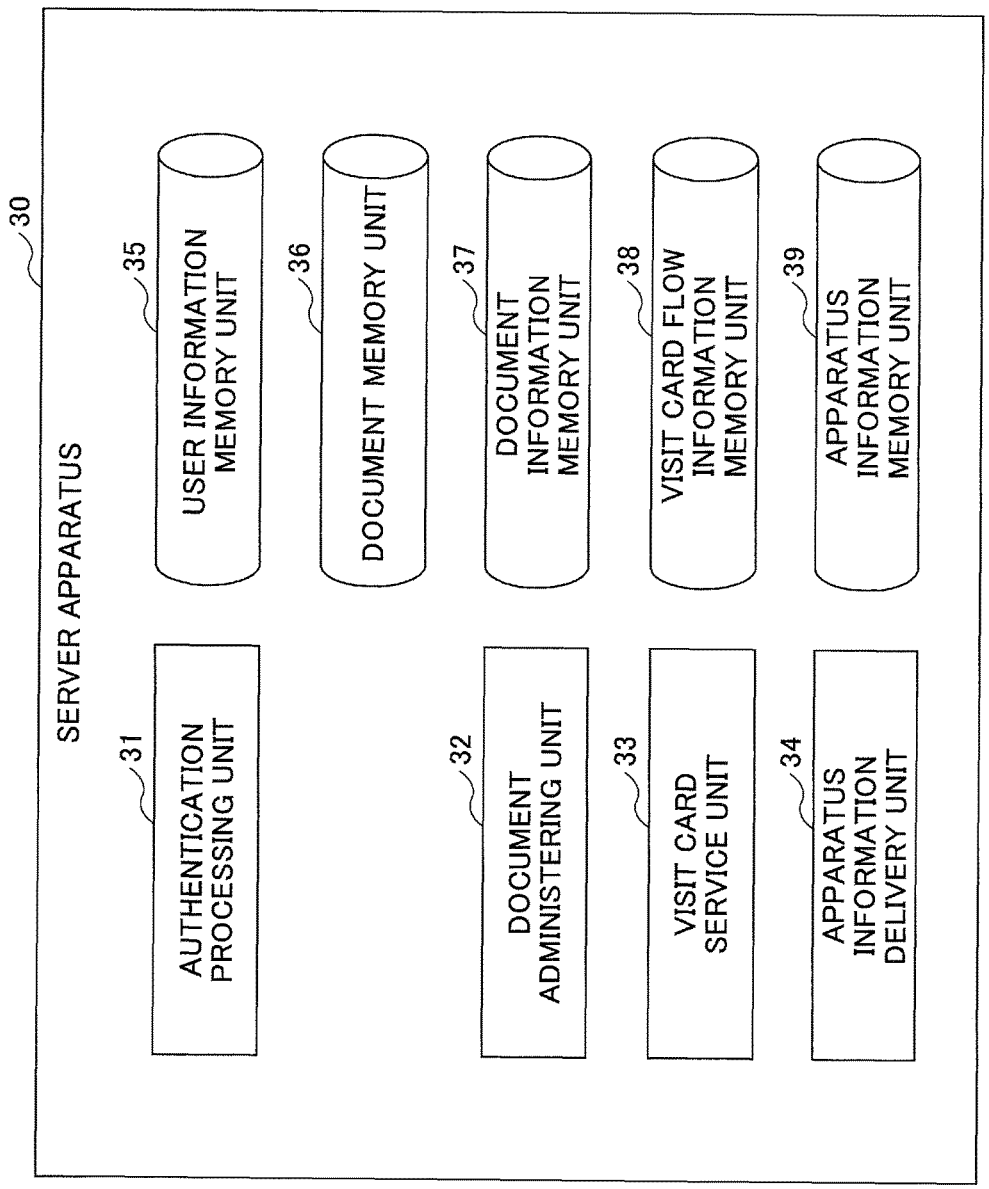
FIG. 5 illustrates an exemplary functional structure of a server apparatus of the embodiment.

FIG. 5 illustrates an exemplary functional structure of a server apparatus of the embodiment. Referring to FIG. 5, the server apparatus 30 includes an authentication processing unit 31, a document administering unit 32, a visit card service unit 33, an apparatus information delivery unit 34, and so on. These units are implemented when at least one program installed on the server apparatus 30 are executed by the CPU. The server apparatus 30 includes a user information memory unit 35, a document memory unit 36, a document information memory unit 37, a visit card flow information memory unit 38, an apparatus information memory unit 39, and so on. These user information memory unit 35, document memory unit 36, document information memory unit 37, visit card flow information memory unit 38, and apparatus information memory unit 39 may be substantialized by, for example, an auxiliary memory device of the server apparatus, a memory device connectable to the server apparatus 30 through the network, or the like.

The authentication processing unit 31 executes the authentication process by referring to the information of the user of the user terminal 20 or the user of the image forming apparatus 10 stored in the user information memory unit 35. With the authentication process, the user of the user terminal 20 or the user of the image forming apparatus 10 is specified. The user information memory unit 35 stores attribute information such as a user identification data (ID), a password, and a name for each user, setup information related to the visit card flow, and so on.

The document administering unit 32 administers the visit card that is a document of a process target in a visit card flow. The document memory unit 36 and the document information memory unit 37 are used to administer the visit card. The document memory unit 36 stores the substance (e.g., portable document format (PDF) data) of the visit card. The document information memory unit 37 stores an operation history caused by operations by the user for each visit card. Specifically, the document information memory unit 37 stores a record at each creation, output (display or print), completion of output with respect to each visit card.

The visit card service unit 33 is an application program provided on the server side and configured to execute a process specified to the visit card flow. For example, the visit card service unit 33 creates the visit card in receipt of the visit request card. The visit card flow information memory unit 38 stores information necessary to administer the visit card flow.

The apparatus information delivery unit 34 delivers the information stored in the apparatus information memory unit 39 to the user terminal 20. The apparatus information memory unit 39 stores information related to an applicable operating method and a printing capability and so on for each of the image forming apparatuses 10. The operating method is described later.

Figure 6:
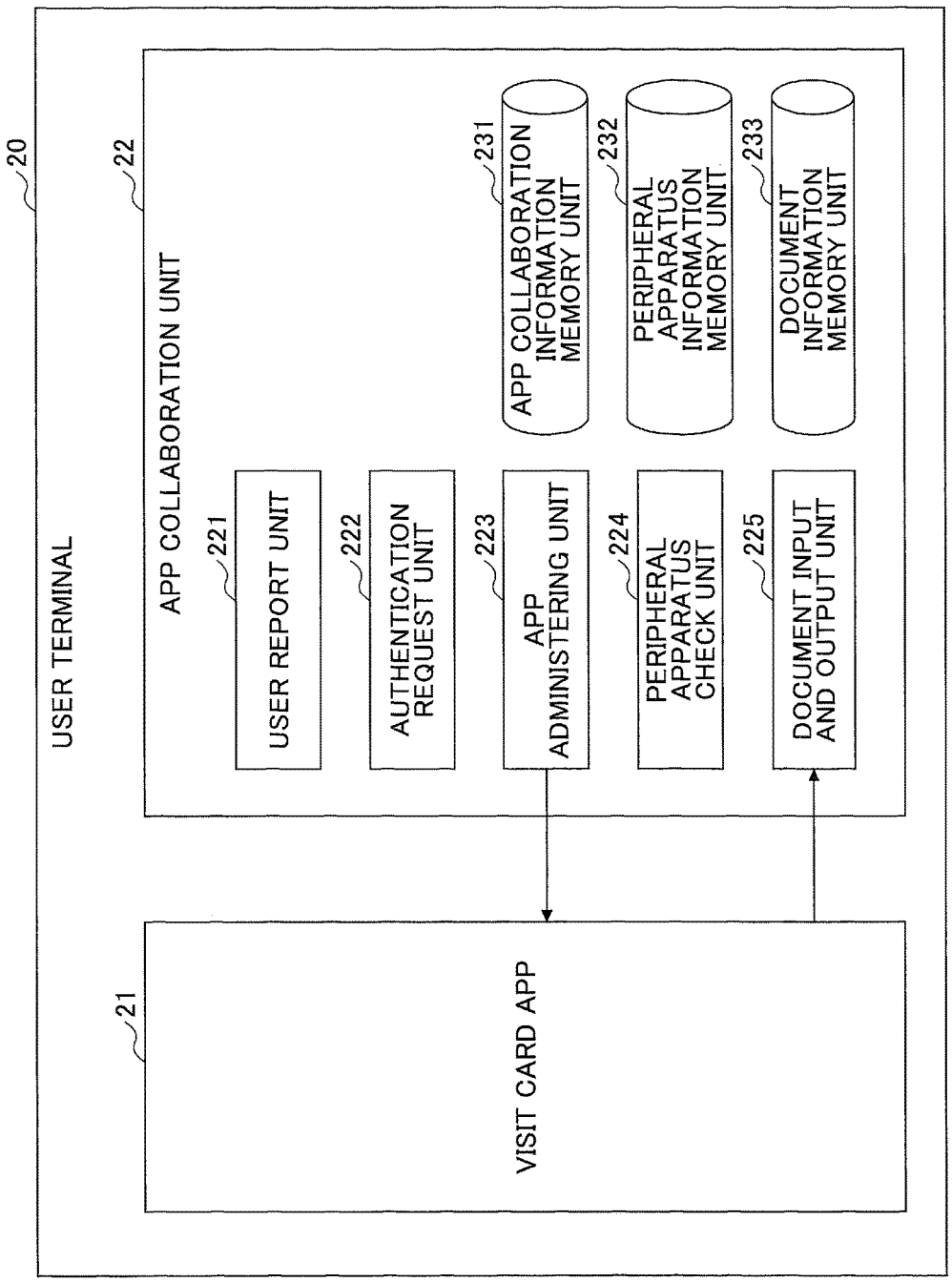
FIG. 6 illustrates an exemplary functional structure of a user terminal of the embodiment of the present invention.

FIG. 6 illustrates an exemplary functional structure of the user terminal of the embodiment of the present invention. Referring to FIG. 6, the user terminal 20 includes a visit card application (app) 21, an app collaboration unit 22, and so on. The visit card application 21, the app collaboration unit 22, and so on are implemented when the at least one program installed in the user terminal 20 is executed by the CPU 201.

The visit card app 21 is an application program provided on the client side and configured to execute a process related to the visit card flow.

The app collaboration unit 22 executes a process of causing the visit card service unit 33 of the server apparatus 30 to collaborate with the visit card app 21. The app collaboration unit 22 provides an abstracted interface for inputting and outputting the document (the visit card) to the visit card app 21. The abstracted interface does not relate to the visit card app 21, for example, in an input mode or an output mode. For example, the app collaboration unit 22 performs the output (e.g., the display or the print) of the document in the mode suitable for the user upon the receipt of a request for the "output". The app collaboration unit 22 performs the user authentication and so on related to the visit card flow. Although the app collaboration unit 22 executes the process in collaboration with the visit card app 21, the app collaboration unit 22 does not depend on a specific application program.

Referring to FIG. 6, the app collaboration unit 22 includes a user report unit 221, an authentication request unit 222, an app administering unit 223, a peripheral apparatus check unit 224, a document input and output unit 225, and so on. The app collaboration unit 22 uses an app collaboration information memory unit 231, a peripheral apparatus information memory unit 232, a document information memory unit 233, or the like. These app collaboration information memory unit 231, peripheral apparatus information memory unit 232, and document information memory unit 233 may be implemented by the auxiliary memory device 203, the memory 202, or the like.

The user report unit 221 reports a start of the workflow to the user. Within the embodiment, the user report unit 221 sends a visit request report to the user.

The authentication request unit 222 receives an input of the authentication information (the user ID and the password) from the user and requests the server apparatus 30 to authenticate the user based on the authentication information so as to specify the user terminal 20.

The app administering unit 223 starts up (invokes) an application program (a visit card app 21) designated in the app collaboration information sent from the server 30 in a case where the user authentication is successful. The app collaboration information includes identification information (hereinafter, a "document ID") or the like of a visit card of an operation target. The received app collaboration information is stored into the app collaboration information memory unit 231. The document ID and so on are stored into the document information memory unit 233.

The peripheral apparatus check unit 224 searches for an input output apparatus (the image forming apparatus 10 of the embodiment) existing around the user terminal 20 or in the vicinity of the user terminal 20. The peripheral apparatus check unit 224 stores information related to the discovered (detected) image forming apparatus 10 in the peripheral apparatus information memory unit 232.

The document input and output unit 225 receives a request for an input or an output of the document (the visit card) from the visit card app 21 started up by the app administering unit 223.

Figure 7:
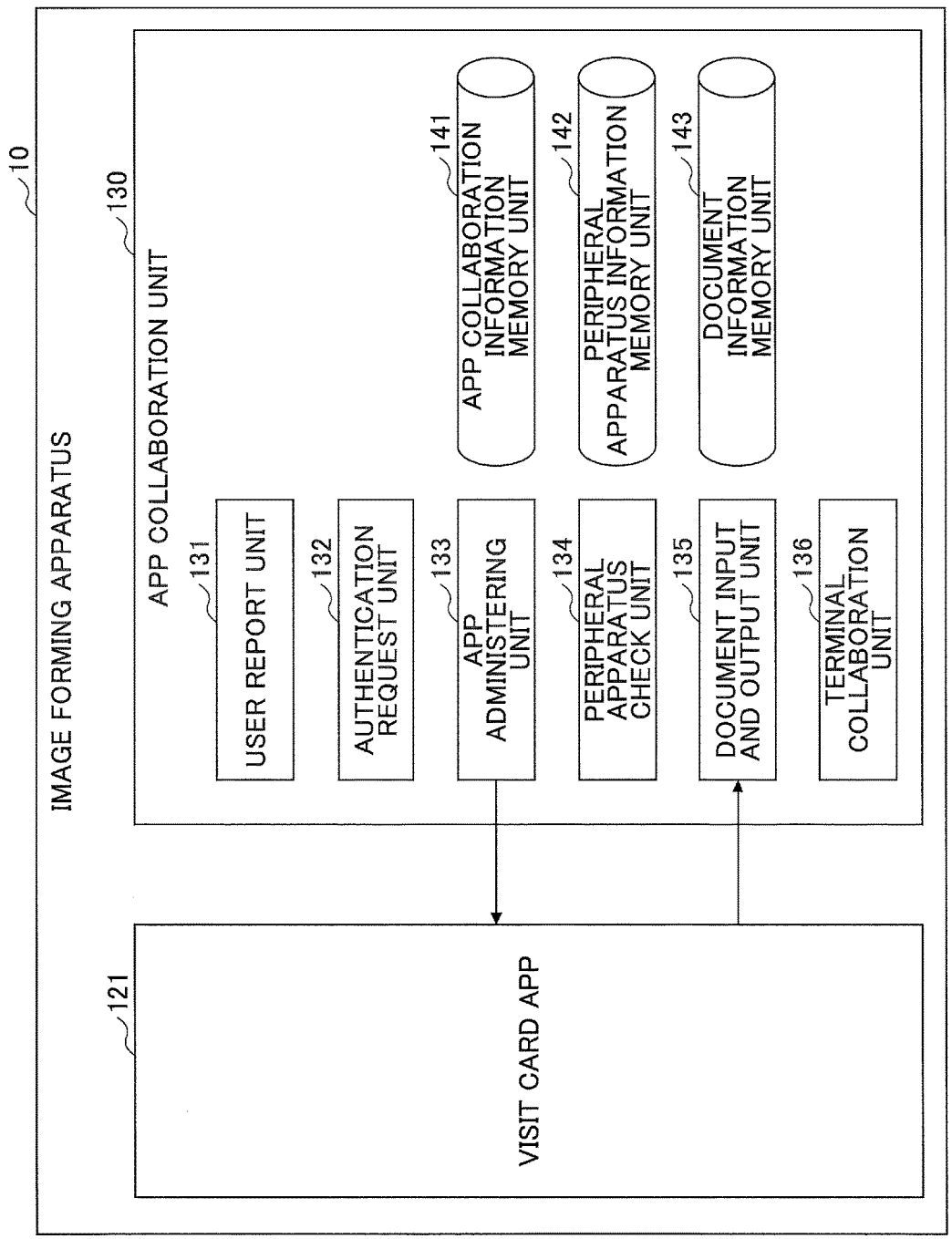
FIG. 7 illustrates an exemplary functional structure of the image forming apparatus of the embodiment of the present invention.

FIG. 7 illustrates an exemplary functional structure of the image forming apparatus of the embodiment of the present invention. Referring to FIG. 7, the image forming apparatus 10 includes a visit card application (app) 121, an app collaboration unit 130, and so on. These visit card app 121, app collaboration unit 130, and so on are implemented when at least one program installed in the image forming apparatus 10 are executed by the CPU 111.

The functions of the visit card app 121 and the app collaboration unit 130 basically similar to the functions of the visit card app 21 and the app collaboration unit 22. Said differently, a user report unit 131, an authentication request unit 132, an app administering unit 133, a peripheral apparatus check unit 134, a document input and output unit 135, an app collaboration information memory unit 141, a peripheral apparatus information memory unit 142, and a document information memory unit 143 respectively correspond to a user report unit 221, an authentication request unit 222, an app administering unit 223, a peripheral apparatus check unit 224, a document input and output unit 225, an app collaboration information memory unit 231, a peripheral apparatus information memory unit 232, and a document information memory unit 233.

However, the app collaboration unit 130 differs from the app collaboration unit 22 at a point that the app collaboration unit 130 has a terminal collaboration unit 136. The terminal collaboration unit 136 executes a process of enabling association between the user terminal 20 and the image forming apparatus 10 through wireless communications.

The app collaboration information memory unit 141, the peripheral apparatus information memory unit 142, and the document information memory unit 143 can be implemented using the HDD 114, the RAM, a memory device that is connectable to the image forming apparatus 10 through the network, or the like.

Subsequently, an output method related to the visit card flow is described. Within the embodiment, the following three output methods of case 1 to case 3 are provided. The output method adopted from among the three output methods is determined depending on the user, the circumstances around the user, or the like.

Figure 8:
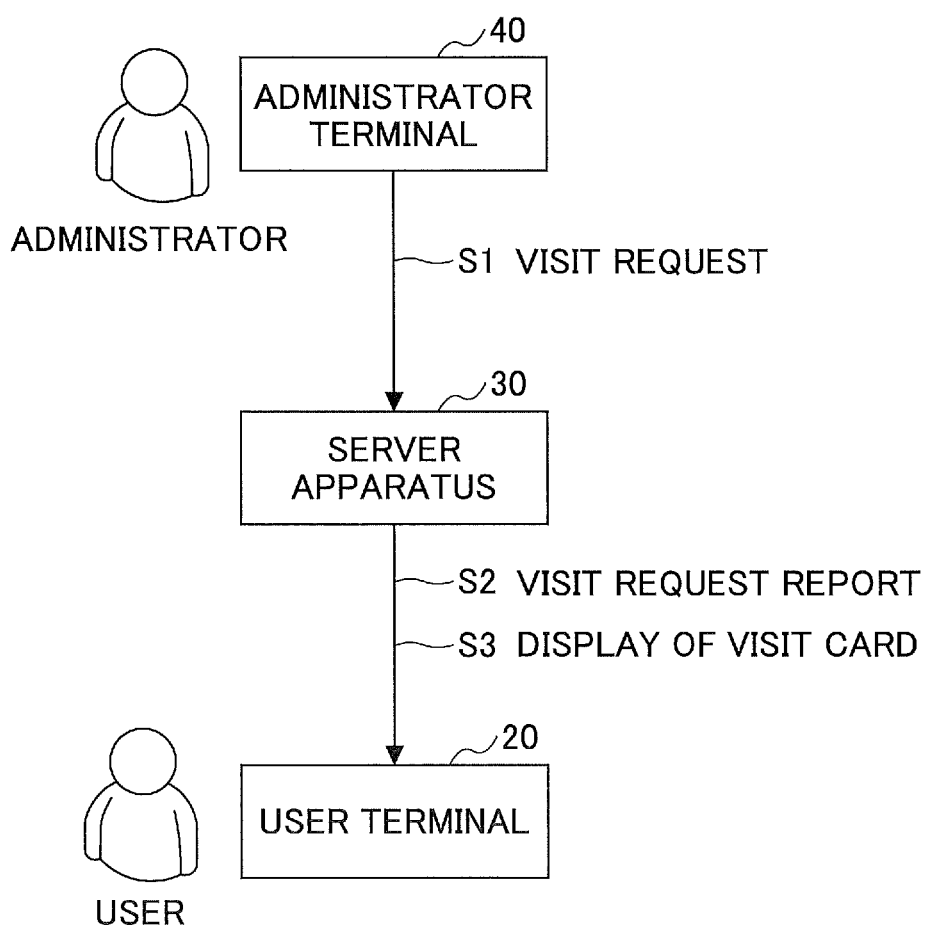
FIG. 8 illustrates the summary of a procedure of case 1.

FIG. 8 illustrates the summary of a procedure of the case 1. After the visit request report input by the administrator is sent from the administrator terminal 40 to the server apparatus 30, the server apparatus 30 creates a visit card (step S1). The server apparatus 30 sends a visit request report to the user terminal 20 of the user designated as the visitor in the visit request report (step S2). The user terminal 20 acquires the visit card corresponding to the visit request report from the server apparatus 30 and displays the visit card so as to be in an editable state (step S3). Thereafter, the user can edit the visit card displayed in the user terminal 20 by using the user terminal 20.

Said differently, in the case 1, the output mode of the visit card is displaying in the user terminal 20. Therefore, in this case, the user does not use the image forming apparatus 10. The case 1 is the output method suitable for the user who wishes to handle the visit card in the state of an electronic document.

Figure 9:
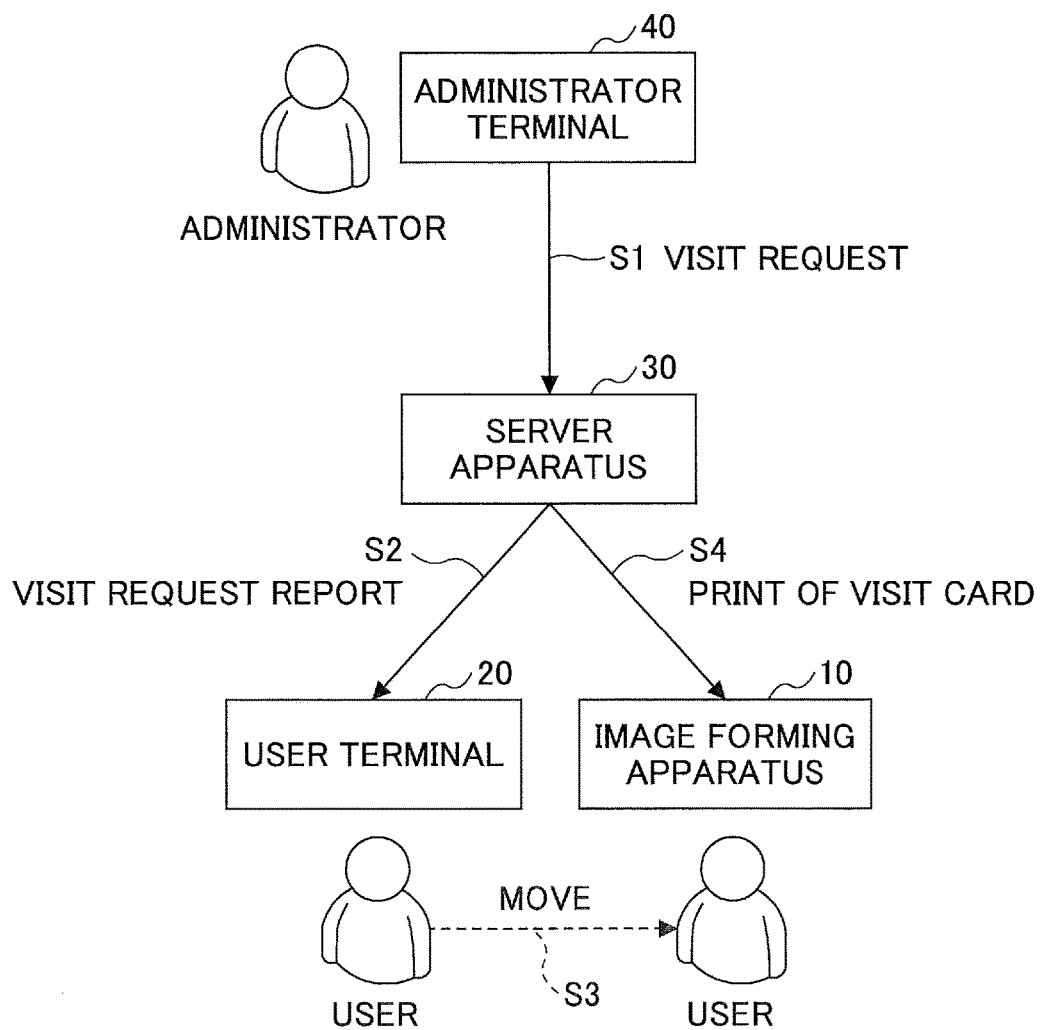
FIG. 9 illustrates the summary of a procedure of case 2.

FIG. 9 illustrates the summary of a procedure of the case 2. The procedure that the server apparatus 30 creates the visit card in response to the visit request report from the administrator terminal 40, and the visit request report is sent to the user terminal 20 in steps S1 and S2 is the same as the procedure of case 1. The user who has checked the visit request report moves to an installation location, in which the image forming apparatus is installed (step S3). The image forming apparatus 10 acquires the visit card corresponding to the visit request report from the server apparatus 30 and prints the visit card in response to the operation by the user (step S4).

Said differently, in the case 2, the output mode of the visit card is printing in the image forming apparatus 10. The case 2 is the output method suitable for the user who wishes to handle the visit card in the state of a paper document.

Figure 10:
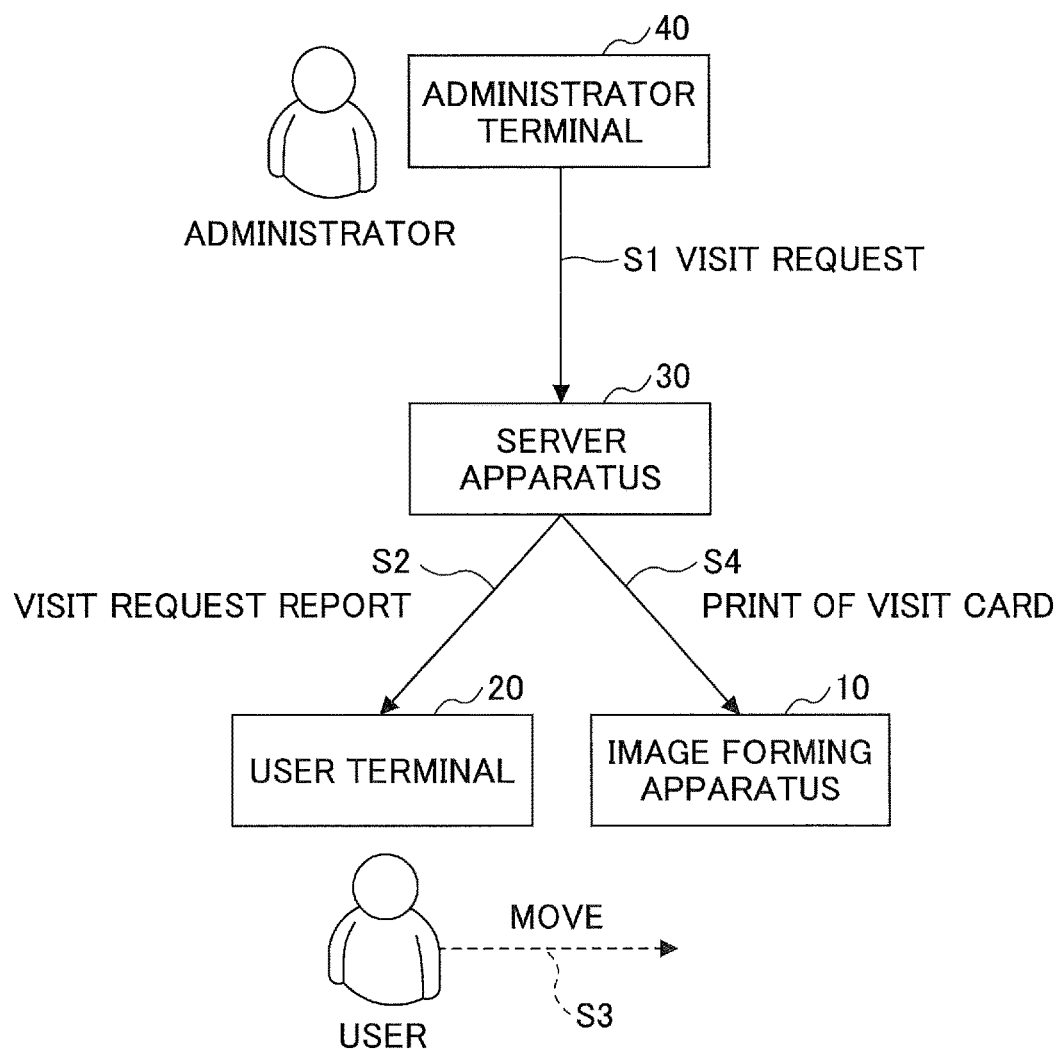
FIG. 10 illustrates the summary of a procedure of case 3.

FIG. 10 illustrates the summary of a procedure of the case 3. The procedure that the server apparatus 30 creates the visit card in response to the visit request report from the administrator terminal 40, the visit request report is sent to the user terminal 20, and the user moves to the installation location, in which the image forming apparatus 10 is installed in steps S1 to S3, is the same as the procedure of case 1.

In case 3, after the user moves to the image forming apparatus 10, the user operates the user terminal 20. The instruction by the user is transmitted to the image forming apparatus 10 by wireless communications between the user terminal 20 and the image forming apparatus 10. The image forming apparatus 10 acquires the visit card corresponding to the visit request report from the server apparatus 30 and prints the visit card in response to the instruction by the user (step S4).

Said differently, in the case 3, the output mode of the visit card is printing in the image forming apparatus 10. The case 3 is the output method suitable for the user who wishes to handle the visit card in the state of the paper document and to use the user terminal to operate the image forming apparatus 10.

Hereinafter, the cases 1, 2, and 3 are sequentially described in the order of the first embodiment, the second embodiment, and the third embodiment.

[First Embodiment]

Figure 11:
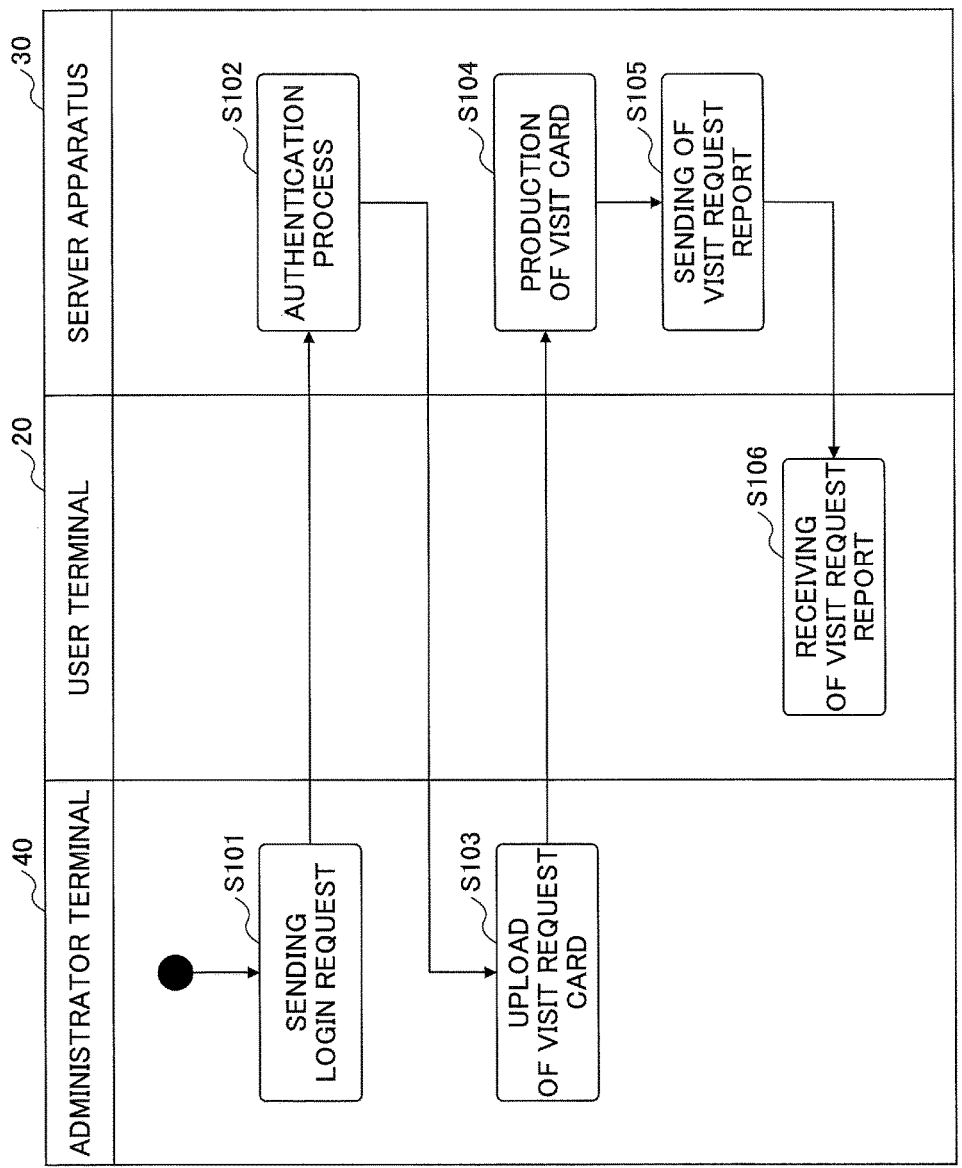
FIG. 11 illustrates an exemplary procedure of a visit request process of a first embodiment.

FIG. 11 illustrates an exemplary procedure of a visit request process of the first embodiment.

In step S101, the administrator terminal 40 receives a login operation from the administrator. In the login operation, the user ID and the password both of the administrator are input. The administrator terminal 40 sends a login request including the user ID and the password as the administrator to the server apparatus 30 (step S101).

In response to the receipt of the login request, the authentication processing unit 31 of the server apparatus 30 refers to the user information memory unit 35 and executes the authentication process for the user ID and the password, which are included in the login request (step S102).

FIG. 12 illustrates an exemplary structure of the user information memory unit. Referring to FIG. 12, the user information memory unit 35 stores user information such as a user ID, a password, a name, a terminal ID, an input output mode, a preferential operation, a flow ID, and an app ID for each user.

The user ID is identification information for each user. The name is a name of the user. The terminal ID is identification information of the user terminal 20 used by the user. The terminal ID may be information for identifying the user terminal 20 when the server apparatus 30 communicates with the user terminal 20. The input output mode is a mode of inputting and outputting the document (the visit card). Within the embodiment, "electronic" meaning the electronic document or "paper" meaning the paper document can be set as the input output mode. The preferential operation is information indicative of the operation method preferentially selected at the time of operating the document. The "terminal" means the operation by the user terminal 20 and corresponds to the case 1. The "operation panel" means the operation through the operation panel 15 of the image forming apparatus 10, and corresponds to the case 2. The "remote" means a remote operation operating the image forming apparatus 10 by the user terminal 20, and corresponds to the case 3. The flow ID is identification information of a workflow corresponding to the user. The "S01" is the flow ID of the visit card flow. The app ID is identification information os an application program, which is to be started u on the client side (the user terminal 20 or the image forming apparatus 10) in the workflow. The "url.s01" designates the app ID both of the visit card app 21 and the visit card 121. The app ID may be a uniform resource locator (URL).

In step S102, if the user ID and the password, which are included in the login request, match the user ID and the password both of the user information whose name is the "administrator", the authentication process is successful. In a case where the authentication process is failed, the process on and after step S103 is not done.

Subsequently, the administrator operates an upload screen that is displayed on the administrator terminal 40 in response to a success of the authentication and inputs an upload instruction to upload the visit request card. The administrator terminal 40 sends the visit request card to the server apparatus 30 in response to the instruction (step S103).

FIG. 13 illustrates a structural example of the visit request card. Referring to FIG. 13, the visit request card includes, for each visit request report, values of items such as a visitor name, a visit destination name, a visit destination address, and a designated visit date. The visitor name is the name of a visitor. The visit destination name is the name of the visit destination (a person to be visited). The visit destination address is the address of the visit destination. The designated visit date is the date when the visitor visits the visit destination.

Referring to FIG. 13, multiple visit request reports may be input at once. Referring to FIG. 13, an example where the visit request card has a structure of a table type. However, the visit request card may have other data types such as a Comma Separated Values (CSV) type and an eXtensible Markup Language (XML) type.

The visit card service unit 33 of the server apparatus 30 creates electronic data (hereinafter, simply referred to as a "visit card") of the visit card for each visit request card upon receipt of the visit request reports (step S104).

FIG. 14 illustrates an exemplary visit card. Referring to FIG. 14, the visit card includes a content of the visit request report, an area into which a visit result (a circumstances check result) is written in, an area into which a signature is written in, and so on.

The visit card service unit 33 inputs the created visit card into the document administering unit 32. The document administering unit 32 stores the visit card into the document memory unit 36 and also stores a history indicating that the visit card is created into the document information memory unit 37.

FIG. 15 illustrates an exemplary structure of a document information memory unit. Referring to FIG. 15, each record in the document information memory unit 37 includes a value for each item of the user ID, a document ID, a status, an output destination, a date, and a flow ID.

The user ID designates a user ID of the visitor corresponding to the visit card. The user ID can be specified base on user information that includes the visitor name included in the visit request report as the name. The document ID is identification information of the visit card. In a case where the visit card in the file type is stored in the document memory unit 36, the file name may be used as the document ID. The status designates a state of the visit card. The status of "pre-browse" is stored in the record created at this timing. The output destination is the item whoes identification information of the output destination is stored in a case where the visit card is output. The date is a date when the record is created. The flow ID is a flow ID of a workflow whose process target is the document (the visit card) corresponding to the document ID. Within this embodiment, the flow ID of the visit card flow is stored.

Referring to FIG. 15, the record corresponding to the state where one visit card (ID01.pdf) is browsed and edited (updated) is illustrated. However, at this timing, only the record at the first row is stored. Further, as illustrated in FIG. 13, in a case where multiple visit request reports are included in the visit request card, a record similar to the first row is stored in the document information memory unit 37 for each visit card.

The visit card service unit 33 stores information visit card flow information (hereinafter, referred to as " ") for administering the visit card flow for each visit card into the visit card flow information memory unit 38.

FIG. 16 illustrates an exemplary structure of a visit card flow information memory unit. Referring to FIG. 16, the visit card flow information memory unit 38 stores the user ID, the name, the visit destination name, the visit destination address, the designated visit date, the job ID, the document ID, and so on.

In the user ID and the document ID, the user ID and the document ID both of which are stored in the document information memory unit 37 with respect to the visit card are transcribed. In to the name, the visit destination name, the visit destination address, and the designated visit date, values included in the visit request report are transcribed. The job ID is identification information of a job of the visit card flow. The job of the visit card flow for each visit card is an execution unit of the visit card flow executed for each visit card. The job ID is created by the visit card service unit 33. Within the embodiment, the job ID is a value obtained by removing the extension from the document ID.

Subsequently, the visit card service unit 33 sends a visit request report to the user terminal 20 corresponding to the visitor in the visit request report for each visit request report (step S105). The user terminal 20 corresponding to the visitor in the visit request report can be specified based on the terminal ID included in the user information (FIG. 12) that is included in the visit request report. The visit request report includes a flow ID that is stored in the document information memory unit 37 and is related to the visit card corresponding to the visit request report, for example.

The user report unit 221 of the user terminal 20 displays a visit request report screen on the display device 211 to report an occurrence of the visit request report to the user in receipt of the visit request report (step S106).

Figure 17:
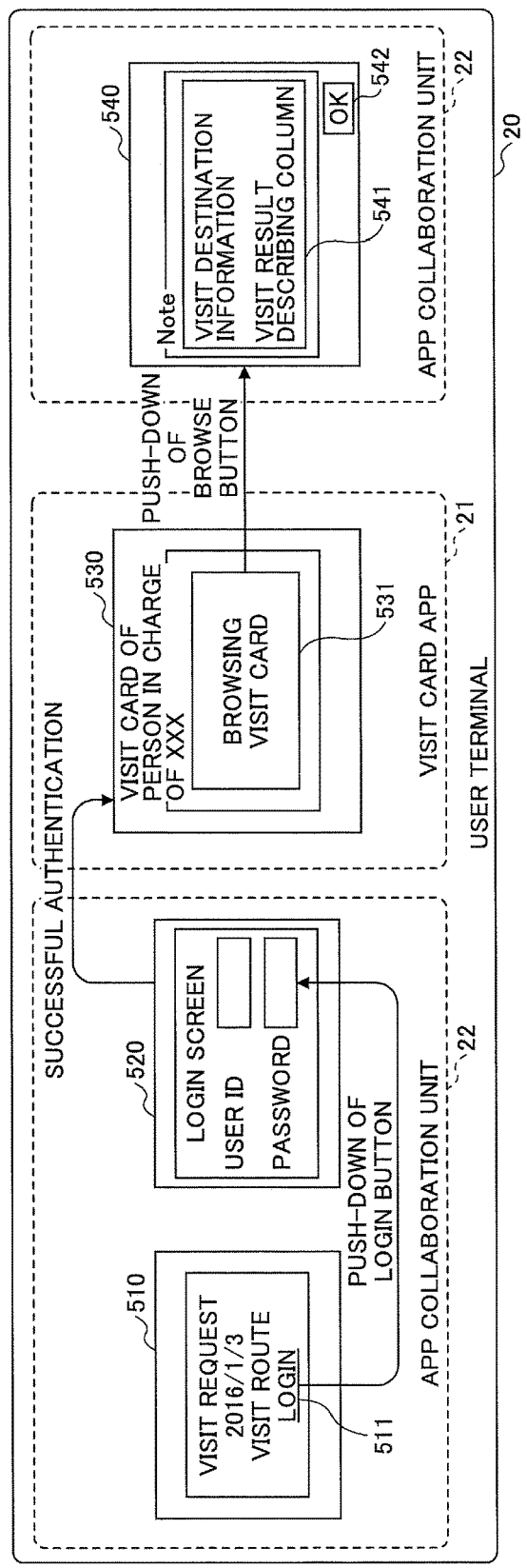
FIG. 17 is a diagram for showing a screen transition of the first embodiment of the present invention.

FIG. 17 is a diagram for showing a screen transition of a first embodiment of the present invention. FIG. 17 illustrates screens displayed in the first embodiment so that the order of displaying the screens, the places of displaying the screens, the subjects of displaying the screens can be distinguished. Said differently, the screens are displayed in the order of the left side to the right side. The rectangle indicating the user terminal 20 in FIG. 17 is displayed in the user terminal. The screen surrounded by the broken line corresponding to the app collaboration unit 22 is displayed by the app collaboration unit 22. The screen surrounded by the broken line corresponding to the visit card app 21 is displayed by the visit card app 21.

In step S106, a visit request report screen 510 on the left end is dislayed on the display device 211. The visit request report screen 510 includes a link 511 for receiving a login instruction.

Figure 18:
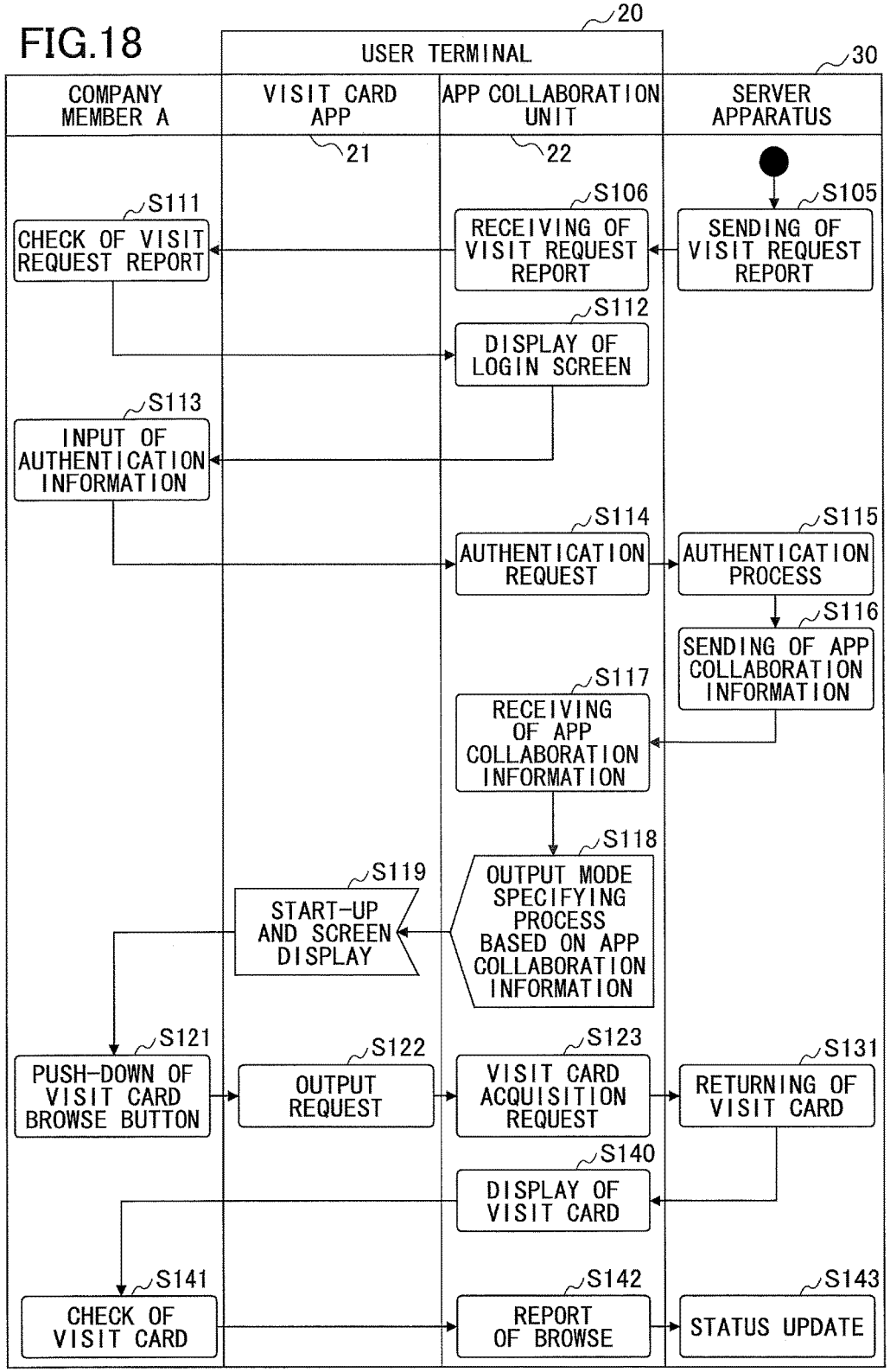
FIG. 18 illustrates an exemplary procedure of a visit card output process of the first embodiment.

Described next is the procedure until the visit card is output in response to the visit request report. FIG. 18 illustrates an exemplary procedure of the visit card output process of the first embodiment. Referring to FIG. 18, the same numbers (S105 and S106) as those in FIG. 11 are given to the corresponding steps, and explanation of these steps is omitted. Here, the visit request report for the company member A is explained. The "company member A" is the name of a certain user.

The "company member A" refers to the visit request report screen 510 and check the occurrence of the visit request report (step S111). Subsequently, the company member A effects (touches) the link 511 on the visit request report screen. Then, the authentication request unit 222 displays a login screen 520 (step S112). Referring to FIG. 17, the login screen 520 includes an area for receiving inputs of the user ID and the password.

The company member A inputs the user ID and the password into the login screen 520 (step S113). Then, the authentication request unit 222 sends an authentication request including the input user ID, the input password, and the flow ID of the visit card flow included in the visit request report to the server apparatus 30 (step S114). The authentication processing unit 31 of the server apparatus 30 refers to the user information memory unit 35 (see FIG. 12) and executes the authentication process for the user ID and the password, which are included in the authentication request (step S115). In a case where the authentication is successful, the steps on or after step S116 is not performed.

In the case where the authentication is successful, the visit card service unit 33 corresponding to the flow ID included in the authentication request sends the app collaboration information to the user terminal 20 being the sending source of the authentication request (step S116). The app collaboration information includes the user information of the authenticated user and the job ID of the visit card flow for the authenticated user. After the app administering unit 223 of the user terminal 20 receives the app collaboration information, the app administering unit 223 stores the app collaboration information in the app collaboration information memory unit 231 (step S117).

FIG. 19 illustrates an exemplary structure of the app collaboration information memory unit. Referring to FIG. 19, the app collaboration information is stored in the app collaboration information memory unit 231. The app collaboration information includes the user information (FIG. 12) and the job ID. FIG. 19 illustrates the user information of the company member A and the job ID included in the visit card flow information (FIG. 16) for the company member.

Subsequently, the app administering unit 223 executes a determination process to determine an output method based on the app collaboration information (step S118). In the determination process of the output method, it is determined which of the cases 1 to 3 the output method suitable for the company member A is. The determination process will be described in detail later. Further, the app administering unit 223 requests the application (i.e., the visit card app 21) corresponding to the app ID included in the app collaboration information to be started up in a mode corresponding to the determination result. Here, a parameter indicative of the case 1 is given to a start-up option of the visit card app 21. Further, the app collaboration information is reported to the visit card app 21.

After the visit card app 21 is started up, the visit card app 21 displays an operation screen 530 of the visit card app 21 on the display device 211 (step S119). Referring to FIG. 17, the operation screen 530 includes a visit card browsing button 531. Here, in order to receive a display instruction (a browse instruction) to display the visit card according to the case 1, the visit card app 21 arranges the visit card browsing button 531 inside the operation screen 530.

Subsequently, the company member A pushes the visit card browsing button 531 (step S121). Then, the visit card app 21 designates a job ID (hereinafter, referred to as a "target job ID") included in the app collaboration information and requests the document input and output unit 225 to output the visit card (step S122). Specifically, the visit card app 21 calls an interface that is provided by the app collaboration unit 22 and receives an output request to output the document to request the document input and output unit 225 to output the document. Subsequently, the document input and output unit 225 sends a visit card acquisition request to acquire the visit card to the server apparatus 30 (step S123). The visit card acquisition request includes the target job ID.

After receiving the visit card acquisition request, the visit card service unit 33 of the server apparatus 30 acquires the visit card corresponding to the target job ID included in the visit card acquisition request through the document administering unit 32 from the document memory unit 36. In more detail, the visit card service unit 33 refers to the visit card flow information memory unit (FIG. 16), specifies the document ID corresponding to the target job ID, and reports the document ID and the terminal ID of the user terminal 20 being the sending source of the acquisition request to the document administering unit 32. The document administering unit 32 acquires the visit card corresponding to the document ID from the document memory unit 36. At this time, the document administering unit 32 stores an operation history related to the visit card corresponding to the document ID into the document information memory unit 37. As in the second row of FIG. 15, the record whose status is "browsing" is added to the document information memory unit 37. In the output destination of this record, the terminal ID reported from the visit card service unit 33 is stored. The visit card service unit 33 returns the visit card acquired by the document administering unit 32 to the user terminal 20 (step S131).

The document input and output unit 225 of the user terminal 20 displays a document display screen 540 on the display device 211 upon receipt of the visit card (step S140). Referring to FIG. 17, the document display screen 540 includes a document display area 541. Although the visit card is omitted in FIG. 17, the document display area 541 displays the visit card illustrated in FIG. 14.

The company member A may refer to the displayed visit card to check the content of the visit request report. The company member A checks the content of the visit request report and then pushes an OK button 542 on the document display screen 540 (step S141). Then, the document input and output unit 225 sends a report of browse indicating that the visit card has been browsed to the server apparatus 30 (step S142). This report includes the target job ID.

The visit card service unit 33 of the server apparatus 30 receives this report, and then a completion of browsing the visit card corresponding to the target job ID included in the report is reported to the document administering unit 32. The document administering unit 32 stores an operation history of the visit card into the document information memory unit 37 (step S143). As in the third row of FIG. 15, the record whose status is "browsed" is added to the document information memory unit 37.

Figure 20:
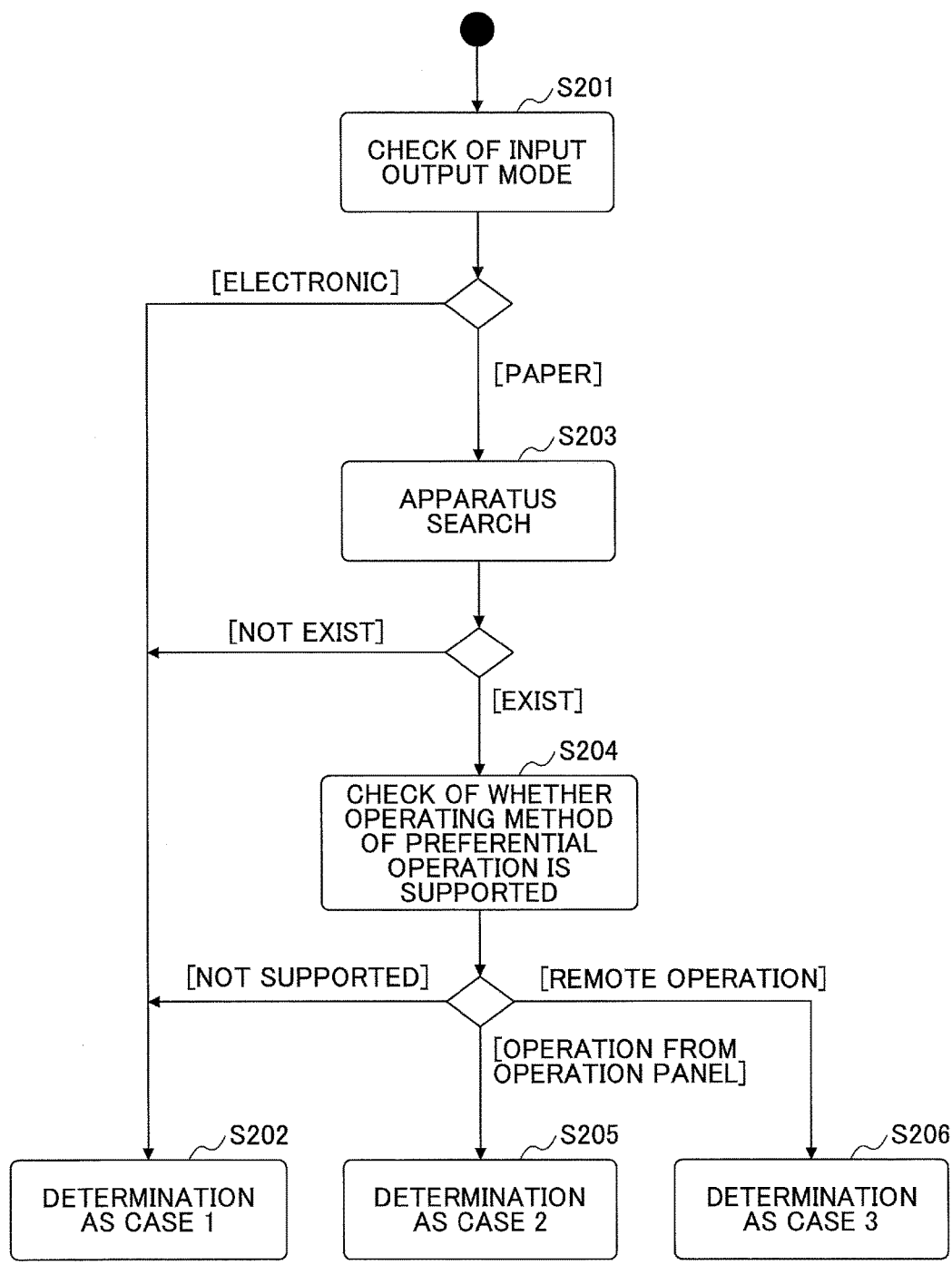
FIG. 20 illustrates an exemplary procedure of a determination process of an output method based on app collaboration information.

Next, a detailed description of the step S118 will be given. FIG. 20 illustrates an exemplary procedure of a determination process of an output method based on app collaboration information.

In step S201, the app administering unit 223 determines whether the input output mode included in the app collaboration information (FIG. 19) that is received in step S117 is "electronic" or "paper". In a case where the input output mode is "electronic", the app administering unit 223 determines that the output method suitable for the user of the user terminal 20 is the case 1 (step S202).

On the other hand, in a case where the input output mode is "paper", the peripheral apparatus check unit 224 searches for the image forming apparatus 10 around the user terminal 20 and acquires apparatus information from the found (detected) image forming apparatus 10 (step S203). The acquired apparatus information is stored into the peripheral apparatus information memory unit 232.

FIG. 21 illustrates an exemplary structure of the peripheral apparatus information memory unit 232. Referring to FIG. 21, the peripheral apparatus information memory unit 232 stores an apparatus name, an apparatus body number, a state, a preferential use, an operating method, and print information, and so on, for each of the found image forming apparatuses 10. Values of these items except for the preferential use are acquired from the found image forming apparatus 10. However, hereinafter, the apparatus information includes the preferential use.

The apparatus name is a name (e.g., a host name) set by the user for each image forming apparatus 10. The apparatus body number is identification information for each individual image forming apparatus 10 determined at a time of manufacturing or shipping the image forming apparatus 10. The state is the state indicative of a print function of the image forming apparatus 10 whether printing is possible or not. The value of the state of the previously found but currently not found image forming apparatus 10 is "no connection". Said differently, the peripheral apparatus information memory unit 232 may keep storing the apparatus information of each of previously found image forming apparatuses that are found at any previous timing. The preferential use is information indicative of whether the peripheral apparatus is preferentially a use target. For example, the image forming apparatus 10 may be selected by the user as the preferential use target from among the found image forming apparatuses 10. Alternatively, the finaly used image forming apparatus 10 may be the preferential use target. The operating method is an operating method applicable to the image forming apparatus 10. The "remote" indicates that a remote operation from the user terminal 20 is applicable to the image forming apparatus 10. The "operation panel" indicates that an operation through the operation panel 15 is applicable to the image forming apparatus 10. The print information is information indicative of a setup value applicable to the print function.

The peripheral apparatus check unit 224 may directly perform wireless communications with the image forming apparatus 10 by means of Bluetooth ("Bluetooth" is a registered trademark), Near field communication (NFC), Wi-Fi Direct ("Wi-Fi Direct" is a registered trademark), or the like without using an enterprise network to find the image forming apparatus 10 around the peripheral apparatus check unit 224 and acquire apparatus information.

The operating method and the print information may not be included in apparatus information acquired from the image forming apparatus 10. In this case, the peripheral apparatus check unit 224 may receive the operating method and the print information from the apparatus information delivery unit 34 of the server apparatus 30. The apparatus information delivery unit 34 delivers the operating method and the print information, both of which are stored in the apparatus information memory unit 39 for each image forming apparatus 10, to the user terminal at a timing when the user terminal 20 inquires or another timing.

FIG. 22 illustrates an exemplary structure of the apparatus information memory unit. Referring to FIG. 22, the apparatus information memory unit 39 stores the apparatus name, the operating method, the print information, and so on for each image forming apparatus 10 that is an administration target. The apparatus name, the operating method, the print information, and so on are previously stored into the apparatus information memory unit 39 by the administrator.

In a case where none of the image forming apparatus 10 is found (detected) in step S203, the app administering unit 223 determines that the output method suitable for the user of the user terminal 20 is the case 1 (step S202). If the image forming apparatus 10 is found, in a case where the values of the states of the apparatus information of all the found image forming apparatuses 10 are "print impossible", the output method may be determined to be case 1.

On the other hand, in a case where at least one printable image forming apparatus 10 is found (detected), the app administering unit 223 checks whether the operating method of the found image forming apparatus 10 (hereinafter, referred to as a "target image forming apparatus 10") includes an operating method corresponding to the preferential operation included in the app collaboration information (step S204). In a case where the value of the input output mode of the app collaboration information is "paper", the preferential operation of the app collaboration information is "remote" or "operation panel". Therefore, in step S204, it is determined whether the operating method of the target image forming apparatus 10 substantially supports any one of "remote" and "operation panel".

Here, the number of the target image forming apparatus 10 is one. Said differently, in the case 1 or the case 2, the user is assumed to already move by then in front of the image forming apparatus 10 that is the operation target. Therefore, in the case where multiple image forming apparatuses 10 are found, the target image forming apparatus 10 may be the image forming apparatus 10 having the strongest received electric wave, for example. In a case where there are multiple image forming apparatuses 10 having nearly equal received electric waves, the target image forming apparatus 10 may be the image forming apparatus 10 which is the preferential use target.

In a case where the target image forming apparatus does not support the preferential operation, the app administering unit 223 determines that the output method suitable for the user is the case 1 (step S202). In a case where the preferential operation is "operation panel" and the operating method of the target image forming apparatus 10 includes "operation panel", the app administering unit 223 determines that the output method suitable for the user is the case 2 (step S205). In a case where the preferential operation is "remote" and the operating method of the target image forming apparatus 10 includes "remote", the app administering unit 223 determines that the output method suitable for the user is the case 3 (step S206).

As described above, within the first embodiment, the company member A uses the user terminal 20 to electronically handle the visit card.

[Second Embodiment]

Second embodiment with regard to the case 2 will be described next. Differences of the second embodiment from the first embodiment are described below. Features of the second embodiment, which are not specifically described, are substantially the same as those of the first embodiment.

Figure 23:
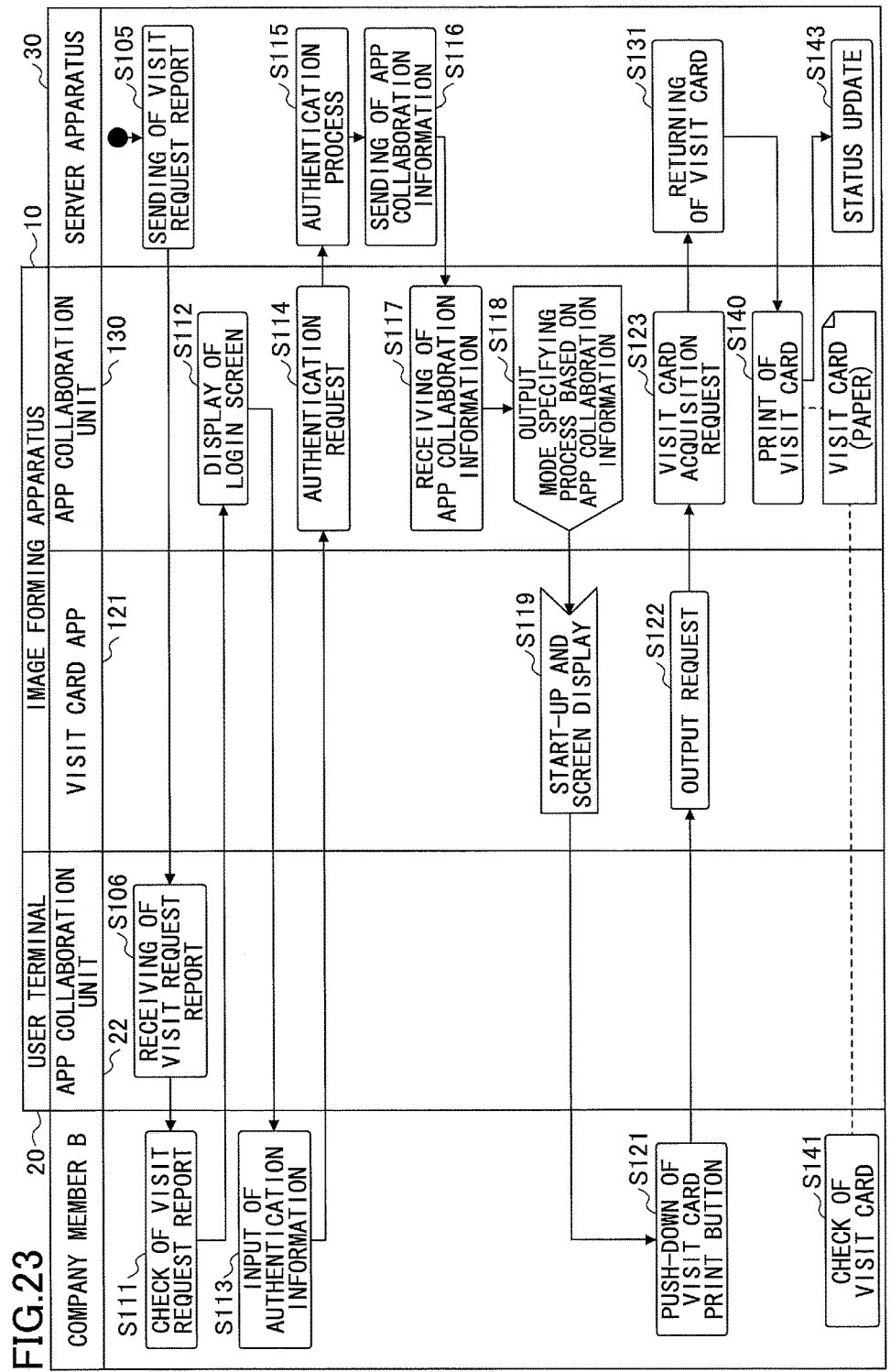
FIG. 23 illustrates an exemplary procedure of the visit card output process of a second embodiment.

FIG. 23 illustrates an exemplary procedure of the visit card output process of the second embodiment. Referring to FIG. 23, the same step numbers as those in FIG. 18 are given to the same steps as or corresponding steps of those in FIG. 18, and explanation of these steps is appropriately omitted. The user in FIG. 23 is a company member B.

Referring to FIG. 23, the authentication request unit 132 of the image forming apparatus 10 performs step S112. Said differently, after the company member B checks the visit request report, the company member B moves in front of a certain image forming apparatus 10. The operating method applicable to the image forming apparatus 10 is "operation panel". For example, if the company member B inputs a login request to the visit card app 121 of the image forming apparatus 10, the authentication request unit 132 displays the login screen 520 on the operation panel 15.

Figure 24:
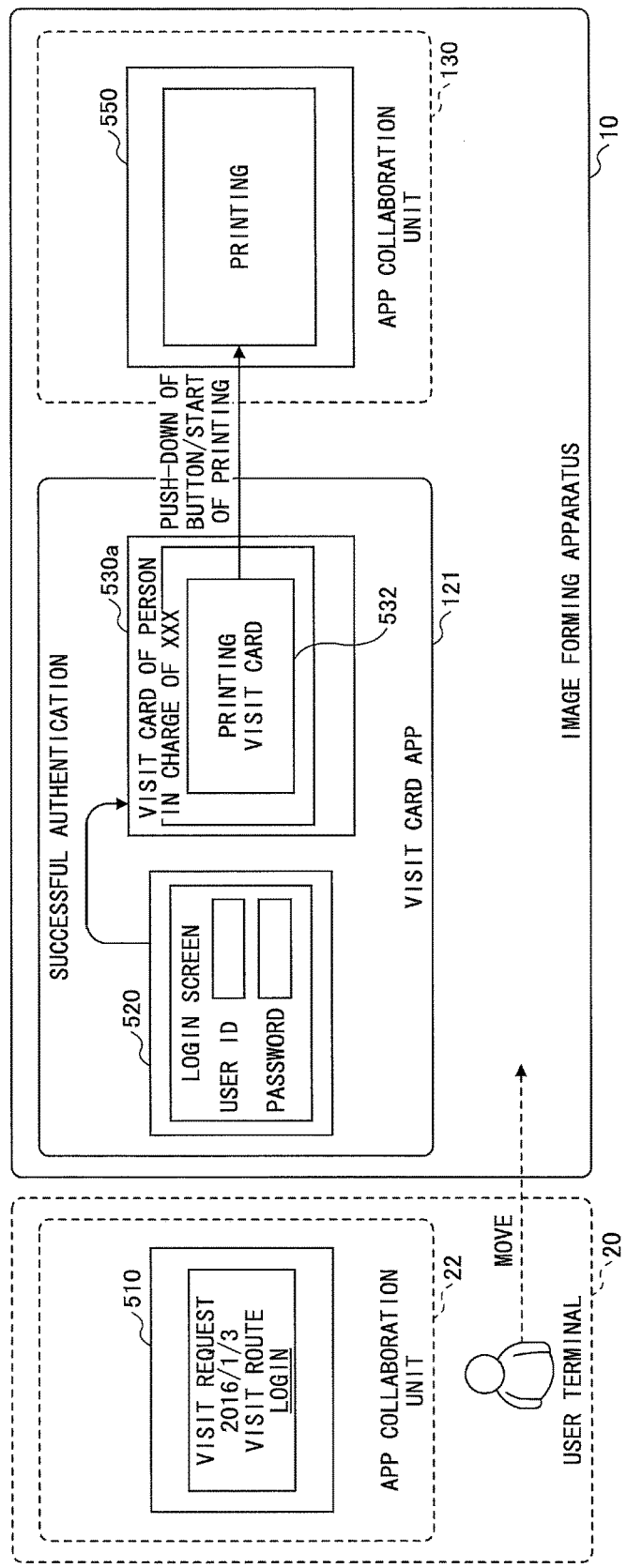
FIG. 24 illustrates an exemplary screen transition of the second embodiment of the present invention.

FIG. 24 illustrates an exemplary screen transition of the second embodiment of the present invention. Referring to FIG. 24, the same reference symbols as those in FIG. 17 are given to the same portions as those in FIG. 17, and explanation of these portions is appropriately omitted.

After the company member B inputs the user ID and the password into the login screen 520 (step S113), the process on and after step S114 is performed. The process performed by the visit card app 21 of the user terminal 20 or by the app collaboration unit 22 in FIG. 17 is performed by the visit card app 121 of the image forming apparatus 10 or by the app collaboration unit 130 in FIG. 24.

In step S118, the app administering unit 133 determines that the output method suitable for the company member B is the case 2. In a case where the app administering unit 133 performs the process in FIG. 20, the apparatus information of the image forming apparatus 10 is acquired in step S203. Said differently, because the user already makes the image forming apparatus 10 the operation target, the search for the image forming apparatus 10 using wireless communications is not done. Alternatively, the determination result acquired by the app administering unit 133 may always be the case 2 irrespective of the app collaboration information. Said differently, the priority may be given to a circumstance where the user is to make the image forming apparatus 10 the operation target than the preferential operation included in the app collaboration information. The app administering unit 133 gives a parameter indicative of the case 2, which is the determination result, to a start-up option of visit card app to request a start-up of the visit card app 121.

After the visit card app 121 is started up, the visit card app 121 displays an operation screen 530a of the visit card app 121 on the operation panel (step S119). Referring to FIG. 24, the operation screen 530a includes a visit card printing button 532. Said differently, in order to deal with the case 2, the visit card app 121 arranges a visit card printing button 532 inside the operation screen 530a so as to receive a print instruction of the visit card.

Subsequently, the company member B pushes the visit card printing button 532 (step S121). Then, the visit card app 121 designates a job ID (hereinafter, referred to as the "target job ID") included in the app collaboration information and requests the document input and output unit 135 to output the visit card (step S122). Specifically, the visit card app 121 calls an interface that is provided by the app collaboration unit 130 and calls an interface for receiving an output request to output the document so as to request the document input and output unit 135 to output the document. The called interface is the same as the interface called in step S122 of FIG. 18.

Subsequently, the document input and output unit 135 acquires the visit card from the server apparatus 30 (steps S123 and S131). Subsequently, the document input and output unit 135 causes the image forming apparatus 10 to print the acquired visit card (step S140). At this time, the document input and output unit 135 displays a screen 550 (see FIG. 24) indicative of "printing" on the operation panel 15. Thereafter, the company member B checks the visit card output as the paper document (step S141).

The document input and output unit 135 sends a report indicating that the visit card is browsed to the server apparatus 30. This report includes the target job ID. The visit card service unit 33 of the server apparatus 30 receives this report, and then a completion of browsing the visit card corresponding to the target job ID included in the acquisition request is reported to the document administering unit 32. The document administering unit 32 stores an operation history of the visit card into the document information memory unit 37 (step S143).

As described, within the second embodiment, the company member B may use the image forming apparatus 10 so as to handle (treat) the visit card as the paper document.

Third embodiment with regard to the case 3 will be described next. Differences of the third embodiment from the first embodiment are described below. Features of the third embodiment, which are not specifically described, are substantially the same as those of the first embodiment.

Figure 25:
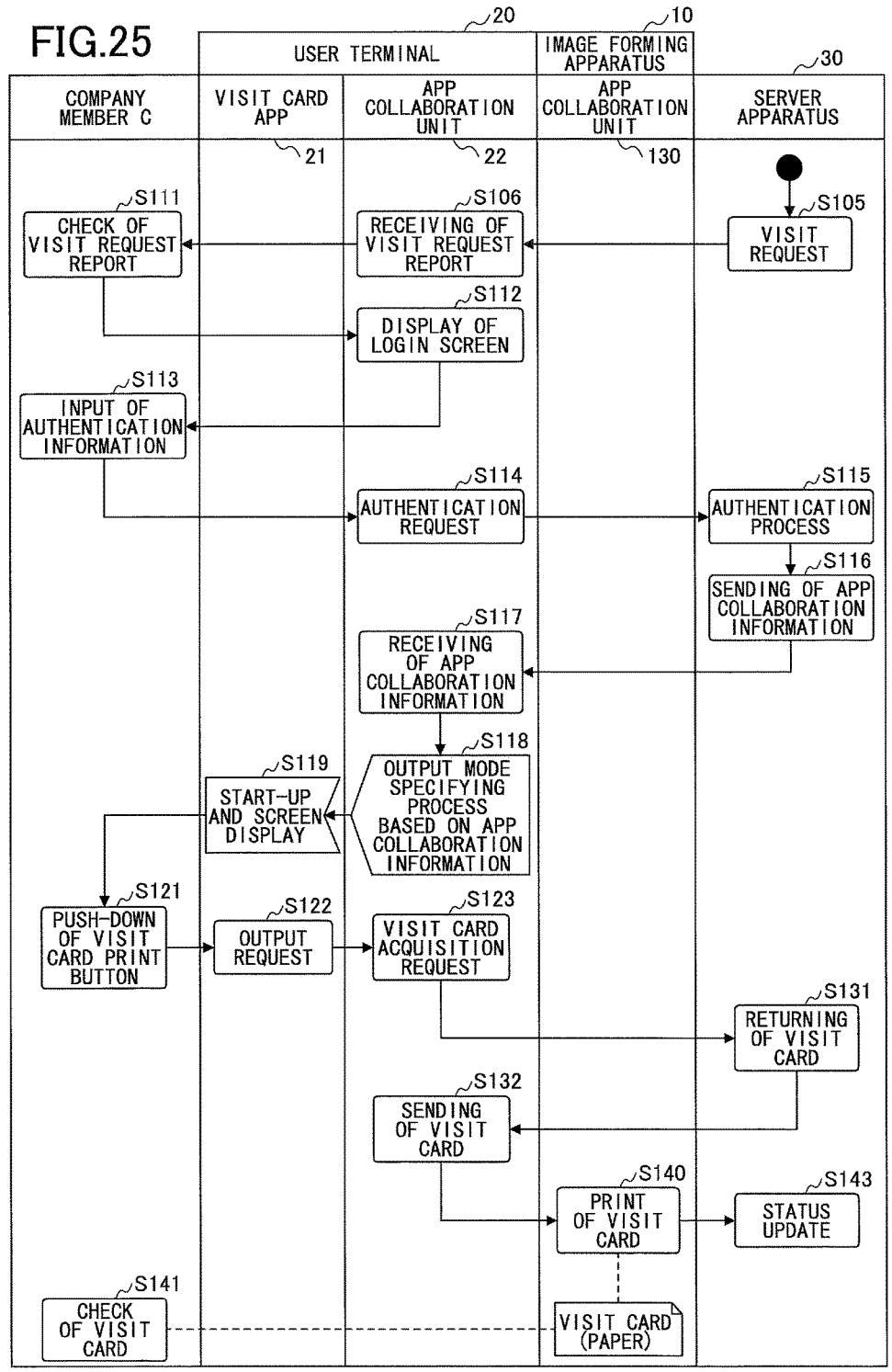
FIG. 25 illustrates an exemplary procedure of the visit card output process of a third embodiment.

FIG. 25 illustrates an exemplary procedure of the visit card output process of the third embodiment. Referring to FIG. 25, the same step numbers as those in FIG. 18 are given to the same steps as or corresponding steps of those in FIG. 18, and explanation of these steps is appropriately omitted. The user in FIG. 25 is a company member C.

The procedure until step S122 is basically similar to FIG. 18. In step S118, the app administering unit 223 determines that the output method suitable for the company member C is the case 3. As illustrated in FIG. 12, this is because the input output mode of the company member C is "paper", and the preferential operation "remote". The image forming apparatus 10, to which the company member C moves, is the image forming apparatus 10 applicable to the remote operation.

Therefore, the visit card app 21 is started up in conformity with the case 3. As a result, the visit card app 21 displays an operation screen 530b illustrated in FIG. 26 on the display device 211.

Figure 26:
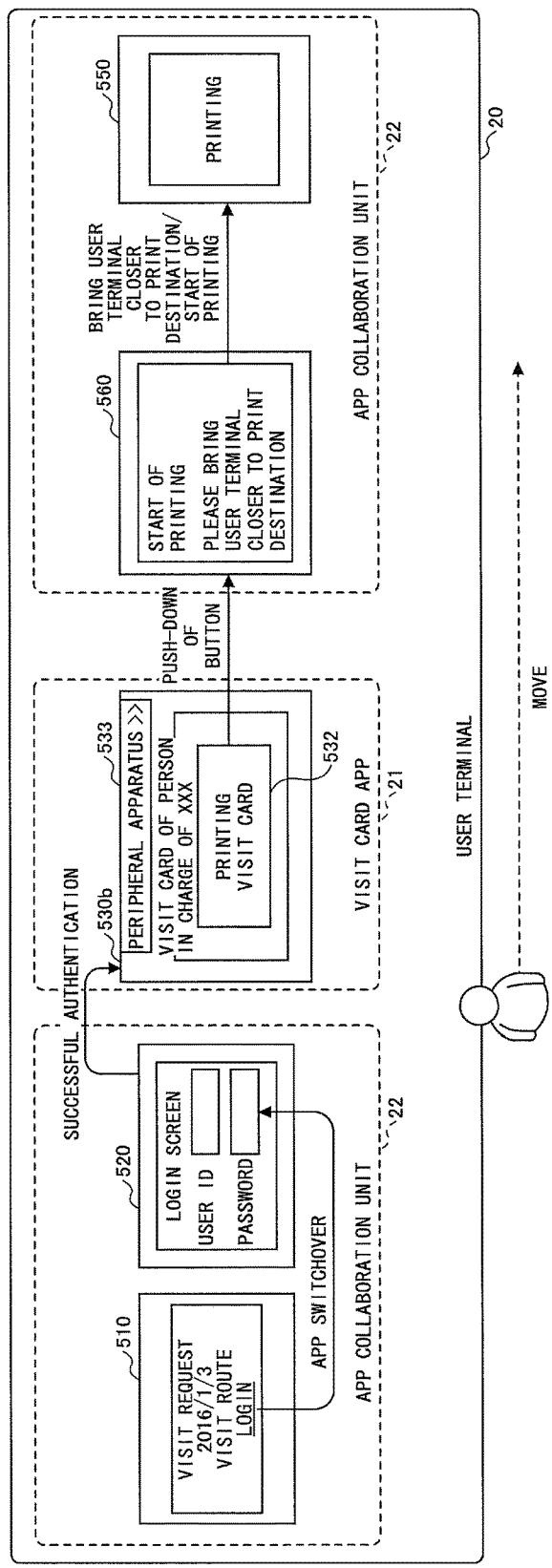
FIG. 26 illustrates an exemplary screen transition of the third embodiment of the present invention.

FIG. 26 illustrates an exemplary screen transition of the third embodiment of the present invention. Referring to FIG. 26, the operation screen 530b includes a peripheral apparatus button 533 in addition to the visit card printing button 532. After the peripheral apparatus button 533 is pushed down, the visit card app 21 displays a view of the image forming apparatuses 10 found by the peripheral apparatus check unit 224 in step S203 of FIG. 20. The company member C selects the image forming apparatus 10 as a print destination of printing the visit card from among the view. This view may be reported from the app administering unit 223 to the visit card app 21 at a time of starting up the visit card app 21.

Subsequently, the company member C pushes the visit card printing button 532 (step S121). Then, the visit card app 121 designates a job ID (hereinafter, referred to as the "target job ID") included in the app collaboration information and requests the document input and output unit 225 to output the visit card (step S122). At this time, identification information (e.g., an apparatus body number) of the image forming apparatus 10 selected by the company member C is reported to the document input and output unit 225.

Subsequently, the document input and output unit 225 sends a visit card acquisition request to acquire the visit card to the server apparatus 30 (step S123). The visit card acquisition request includes the target job ID. The document input and output unit 225 displays a print start screen 560 on the display device 211. Referring to FIG. 26, the print start screen 560 displays a message prompting the user to bring the user terminal 20 closer to the image forming apparatus 10. The company member C brings the user terminal 20 closer to the image forming apparatus 10. Then, wireless communications are established between the image forming apparatus 10 and the user terminal 20.

The visit card service unit 33 of the server apparatus 30 receives this visit card acquisition request, and then the visit card corresponding to the target job ID included in the acquisition request is returned to the user terminal (step S131). After the document input and output unit 225 receives the visit card, the document input and output unit 225 sends the visit card to the image forming apparatus 10 through the wireless communications (step S132). The visit card is received by the terminal collaboration unit 136 of the image forming apparatus 10. Subsequently, the terminal collaboration unit 136 of the image forming apparatus 10 requests the document input and output unit 135 to output the visit card. In response to this request, the document input and output unit 135 causes the image forming apparatus 10 to print the acquired visit card (step S140). At this time, the document input and output unit 135 displays a screen 550 (see FIG. 26) indicative of "printing" on the operation panel 15. Thereafter, the company member B checks the visit card output as the paper document (step S141).

[Fourth Embodiment]

The Fourth Embodiment is described next. Differences of the fourth embodiment from the first embodiment are described below. Features of the four embodiment, which are not specifically described, are substantially the same as those of the embodiment.

FIG. 27 illustrates an exemplary procedure of the visit card output process of the fourth embodiment. In FIG. 27, the process on or before step S122 is the same as the process illustrated in FIG. 25.

In step S1221, the document input and output unit 225 displays a print start screen 560 on the display device 211. When the company member bring the user terminal 20 closer to the image forming apparatus 10, the wireless communications are started between the image forming apparatus 10 and the user terminal 20. Then, the document input and output unit 225 sends an output request of the visit card to the image forming apparatus 10 by the wireless communications. The output request includes the target job ID. Further, the output request may be a remote call of an interface included in the document input and output unit 135 of the image forming apparatus 10. The remote call may be implemented by the terminal collaboration unit 136.

Subsequently, the document input and output unit 135 sends the visit card acquisition request to acquire the visit card to the server apparatus 30 (step S123). The visit card acquisition request includes the target job ID. The visit card service unit 33 of the server apparatus 30 receives this visit card acquisition request, and then the visit card corresponding to the target job ID included in the visit card acquisition request is returned to the image forming apparatus 10 (step S125).

Subsequently, steps on and after step S140 are performed.

Within the fourth embodiment, the visit card is transferred to the image forming apparatus 10 without passing through the user terminal 20. Accordingly, the fourth embodiment is suitable for a case where the administrator does not wish the electronic data of the visit card to be stored into the user terminal 20.

The first embodiment to the fourth embodiment may be practiced in combination.

As described above, according to the first embodiment to the fourth embodiment, the output destination of the visit card can be changed in response to the user or the circumstances (whether the image forming apparatus 10 exists around the user) of the user. Therefore, it is possible to relax the limit related to the input or the output of the document.

In the above description, although the output of the visit card has been described, the input of the visit card can be performed using a similar procedure. For example, in the case 1, the input of the visit card from the user terminal 20 may be storing of a result obtained by the user of editing the visit card that is acquired by the user terminal 20. Further, in the cases 2 and 3, the input of the visit card from the image forming apparatus 10 may be scanning of the visit card as the paper document by the image forming apparatus 10.

In the above embodiments, the user terminal 20 is an example of an information processing apparatus. The image forming apparatus 10 is an example of an apparatus. The peripheral apparatus check unit 224 is an example of a search unit. The document input and output unit 225 is an example of a search unit, a request unit, an execution unit, and a second acquisition unit. The authentication request unit 222 is an example of a specifying unit. The app administering unit 223 is an example of a first acquisition unit and a receiving unit. The job ID is an example of data identification information.

According to the present invention, it is possible to relax a limit related to the input or the output of the document.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the information processing system of the present invention has been described in detail, it should be understood that various changes, substitutions, and alterations could be made thereto without departing from the spirit and scope of the invention.

The order of the method of the embodiment of the present invention is not limited to the order of processes of the method disclosed by this disclosure.

It should be noted that a person skilled in the field of information processing technology may employ the present invention using application specific integrated circuits (ASIC) or an apparatus in which circuit modules are connected.

Further, each of the functions (units) may be implemented by one or more circuits.

It should be noted that, in this specification, the circuit may include a processor programed by software to execute the corresponding functions and hardware which is designed to execute the corresponding functions such as the ASIC and the circuit module.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium. The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The computer software can be provided to the programmable device using any storage medium for storing processor readable code such as a floppy disk, hard disk, CD ROM, magnetic tape device or solid state memory device.

What is claimed is:

1. An information processing system comprising:
an image forming apparatus; and
an information processing apparatus including
a processor, and
a memory storing a program that, when executed by the processor, causes the processor to
determine an input-output mode indicated in application collaboration information received from an authentication system, the input-output mode having been set in advance,
execute a search for the image forming apparatus through a wireless communication in a case where the determined input-output mode includes use of the image forming apparatus to output data,
request the image forming apparatus to output the data in response to finding the apparatus, and
execute the output of the data to a display of the information processing apparatus, and receive input to the data in response to a failure to find the image forming apparatus.

2. The information processing system according to claim 1,
wherein execution of the program further causes the processor to
specify a user of the information processing apparatus, and
acquire information-indicative of an input source or an output destination of the data, the information indicative of the input source or the output destination of the data being stored in a memory unit with respect to the specified user,
wherein the information processing apparatus executes the input or the output of data regardless of a search result in response to an event where the information indicative of the input source or the output destination of the data designates the information processing apparatus.

3. The information processing system according to claim 1,
wherein execution of the program further causes the processor to
receive identification information of the data through a network, and
acquire the data associated with the received identification information,
wherein the information processing apparatus outputs the received data.

4. The information processing system according to claim 1,
wherein execution of the program further causes the processor to
receive identification information of the data through a network,
wherein the information processing apparatus
reports the received identification information to the image forming apparatus, and
requests the image forming apparatus to execute the output of the data to initiate acquisition, by the image forming apparatus, of the data corresponding to the identification information.

5. The information processing system according to claim 1, wherein the data includes one or more items of information selected from among a visitor name, a visit destination name, a visit destination address, and a designated visit date.

6. The information processing system according to claim 1, wherein execution of the program further causes the processor to:
output the data in an editable form to the display of the information processing apparatus, and
receive input from a user to edit the data in response to the failure to find the image forming apparatus.

7. A method for processing information performed in an information processing apparatus, the method comprising:
determining an input-output mode indicated in application collaboration information received from an authentication system, the input-output mode having set in advance,
executing a search for an image forming apparatus through a wireless communication in a case where the determined input-output mode includes use of the image forming apparatus to output data,
requesting an execution of an input or an output of the data by the image forming apparatus in response to finding the apparatus, and
executing the output of the data to a display of the information processing apparatus, and receive input to the data in response to a failure to find the image forming apparatus.

8. The method according to claim 7,
wherein the method further comprises
specifying a user of the information processing apparatus, and
acquiring information indicative of an input source or an output destination of the data, the information indicative of the input source or the output destination of the data being stored in a memory unit with respect to the specified user
wherein the information processing apparatus executes the input or the output regardless of a search result in response to an event where the information indicative of the input source or the output destination of the data designates the information processing apparatus.

9. The method according to claim 7,
wherein the method further comprises
receiving identification information of the data through a network, and
acquiring the data associated with the received identification information,
wherein the information processing apparatus outputs the received data.

10. The method according to claim 7,
wherein the method further comprises
receiving identification information through a network,
reporting the received identification information to the image forming apparatus, and
requesting the image forming apparatus to execute the output of the data to initiate acquisition, by the image forming apparatus, of the data corresponding to the identification information.

11. The method according to claim 7, wherein the data includes one or more items of information selected from among a visitor name, a visit destination name, a visit destination address, and a designated visit date.

12. The method according to claim 7, wherein the method further comprises:
outputting the data in an editable form to the display of the information processing apparatus, and
receiving input from a user to edit the data in response to the failure to find the image forming apparatus.

13. A computer program product comprising a non-transitory computer-readable medium having a computer program recorded thereon, the computer program being executable on an information processing apparatus, and when executed, causing the information processing apparatus to:

determine an input-output mode indicated in application collaboration information received from an authentication system, the input-output mode having set in advance, execute a search for an image forming apparatus through a wireless communication in a case where the determined input-output mode includes use of the image forming apparatus to output data, request the image forming apparatus to execute an input or an output of the data in response to finding the image forming apparatus, and execute the output of the data to a display of the information processing apparatus, and receive input to the data in response to a failure to find the image forming apparatus.

14. The computer program product according to claim 13, wherein execution of the program further causes the information processing apparatus to:

specify a user of the information processing apparatus, and acquire information that is indicative of an input source or an output destination of the data, the information indicative of the input source or the output destination of the data being stored in a memory unit with respect to the specified user wherein the execution of the input or the output of the data causes the information processing apparatus to execute the input or the output regardless of a search result in response to an event where the information designates the information processing apparatus.

15. The computer program product according to claim 13, wherein execution of the program further causes the information processing apparatus to:

receive identification information of the data through a network, and acquire the data associated with the received identification information, wherein the information processing apparatus outputs the received data.

16. The computer program product according to claim 13, wherein execution of the program further causes the information processing apparatus to:

receive identification information of the data through a network, wherein the information processing apparatus reports the received identification information to the image forming apparatus, and requests the image forming apparatus to execute the output of the data to initiate acquisition, by the image forming apparatus, of the data corresponding to the identification information.

17. The computer program product according to claim 13, wherein the data includes one or more items of information selected from among a visitor name, a visit destination name, a visit destination address, and a designated visit date.

18. The computer program product according to claim 13, wherein execution of the program further causes the information processing apparatus to:

execute the output of the data in an editable form to a display of the information processing apparatus, and receive input from a user to edit the data in response to a failure to find the image forming apparatus.

* * * * *